(12) United States Patent
Niwata et al.

(10) Patent No.: US 6,332,578 B1
(45) Date of Patent: Dec. 25, 2001

(54) ADAPTER

(75) Inventors: Tsuyoshi Niwata; Shigeru Hashimoto, both of Kawasaki (JP)

(73) Assignee: Fijitsu Limited, Kawasaki (JP)

( * ) Notice: Subject to any disclaimer, the term of this patent is extended or adjusted under 35 U.S.C. 154(b) by 0 days.

(21) Appl. No.: 09/580,872

(22) Filed: May 30, 2000

Related U.S. Application Data

(63) Continuation of application No. 09/044,230, filed on Mar. 19, 1998, now abandoned.

(30) Foreign Application Priority Data

Oct. 17, 1997 (JP) .................................................... 9-285300

(51) Int. Cl.⁷ .................................................... G06K 7/00
(52) U.S. Cl. .......................... 235/486; 235/441; 235/492
(58) Field of Search ................................. 235/486, 487, 235/380, 475–479, 492, 441

(56) References Cited

U.S. PATENT DOCUMENTS

| | | |
|---|---|---|
| 4,860,128 | 8/1989 | Nakagawa . |
| 5,159,182 | 10/1992 | Eisele . |
| 5,296,692 | 3/1994 | Shino . |
| 5,338,923 | 8/1994 | Grieu . |
| 5,341,493 | 8/1994 | Yanai et al. . |
| 5,457,590 | 10/1995 | Barrett et al. . |
| 5,465,381 | 11/1995 | Schmidt et al. . |
| 5,471,038 | 11/1995 | Eisele et al. . |
| 5,584,043 | 12/1996 | Burkart . |
| 5,590,192 | 12/1996 | Lovett et al. . |
| 5,615,387 | 3/1997 | Crockett, Jr. et al. . |
| 5,844,757 | 12/1998 | Rose . |
| 5,905,246 | 5/1999 | Fajkowski . |
| 5,923,630 | * 7/1999 | Yoshida et al. ..................... 369/77.2 |
| 6,049,843 | * 4/2000 | Akasaka et al. ........................ 710/74 |
| 6,149,064 | * 11/2000 | Yamaoka et al. ..................... 235/479 |
| 6,193,162 | * 2/2001 | Niwata et al. ........................ 235/487 |

FOREIGN PATENT DOCUMENTS

| | | |
|---|---|---|
| 2696863 | 4/1994 | (FR) . |
| 403233790 A | 10/1991 | (JP) . |
| 404205079 A | 7/1992 | (JP) . |
| 405233887A | 9/1993 | (JP) . |
| WO 97/07481 | 2/1997 | (WO) . |
| WO 98/11497 | 3/1998 | (WO) . |

\* cited by examiner

*Primary Examiner*—Thien M. Le
(74) *Attorney, Agent, or Firm*—Armstrong, Westerman, Hattori, McLeland & Naughton, LLP

(57) ABSTRACT

A disk-cartridge-type adapter is shaped like a disk cartridge. The adapter has an insertion detector and a rotation detector. Power supply to a controller of the adapter is enabled when the adapter is inserted into a disk cartridge drive. Power supply to other parts of the adapter is enabled when a motor of the disk cartridge drive starts to rotate. This arrangement reduces the power consumption of the adapter.

35 Claims, 37 Drawing Sheets

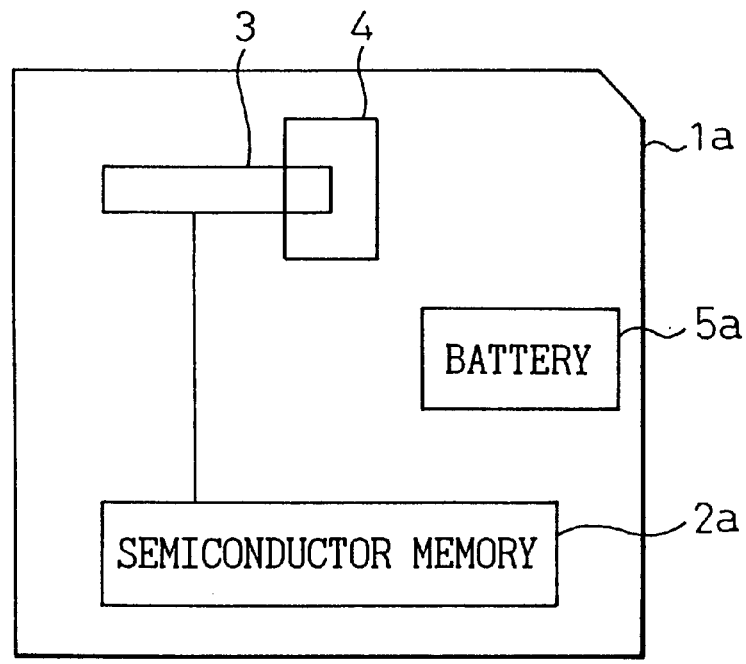
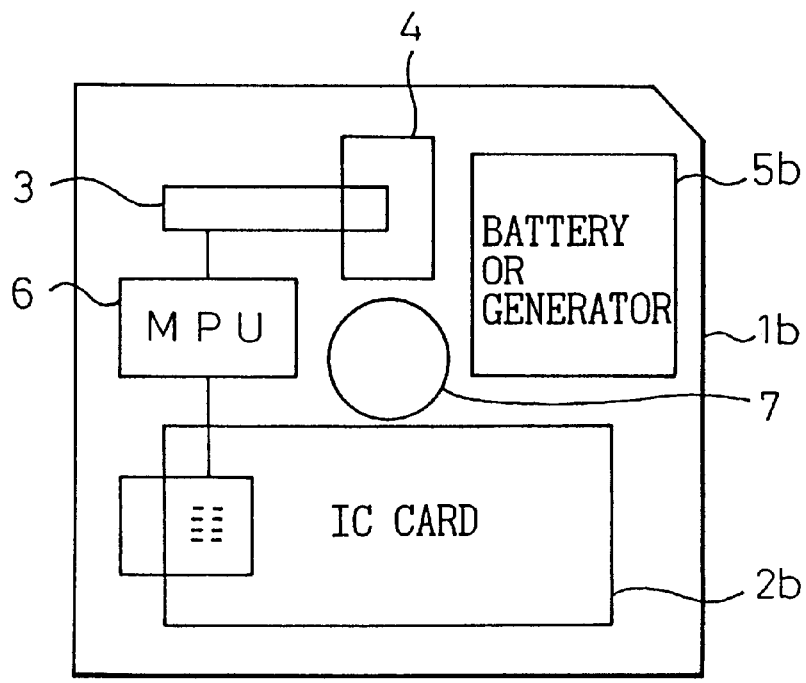

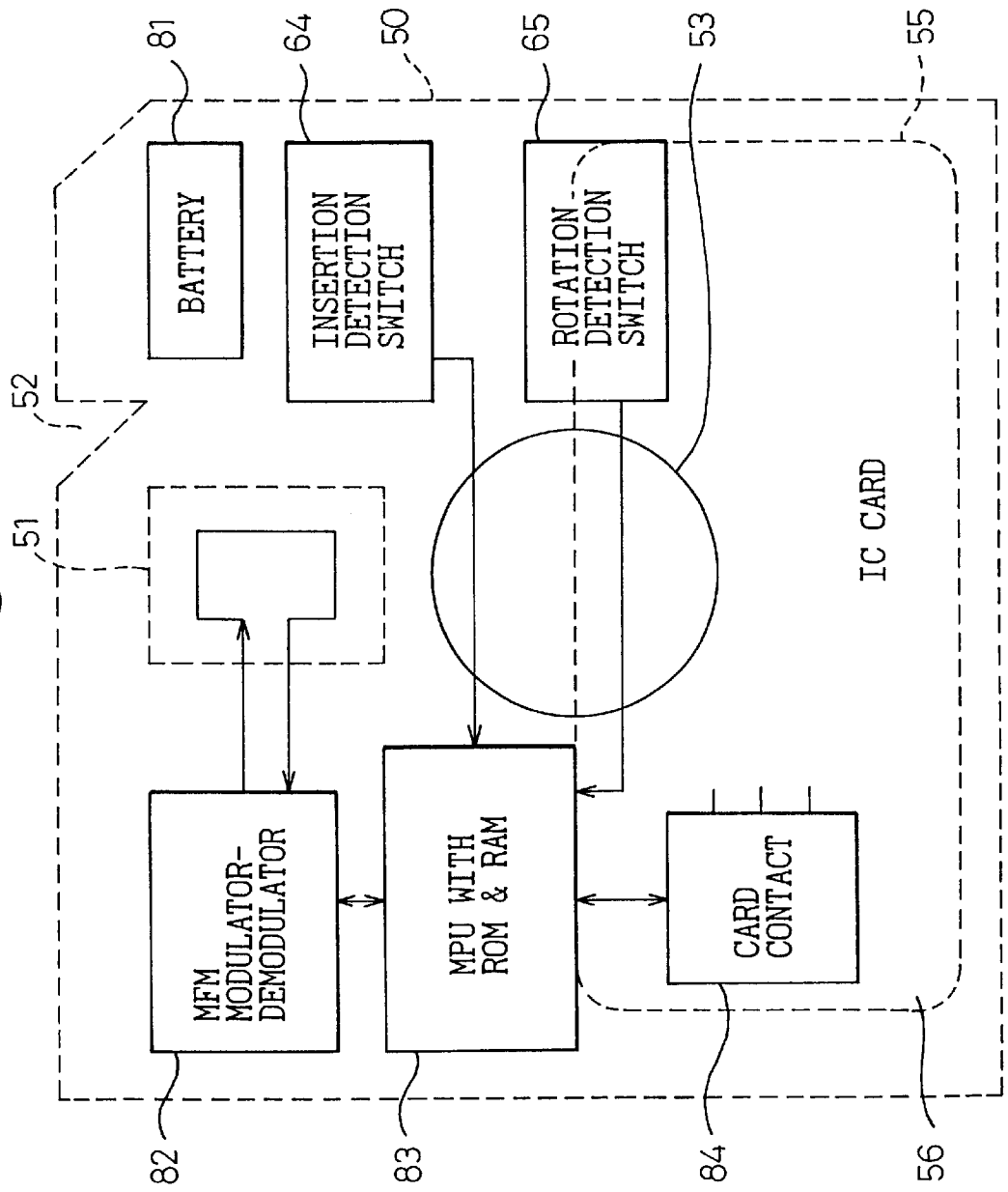

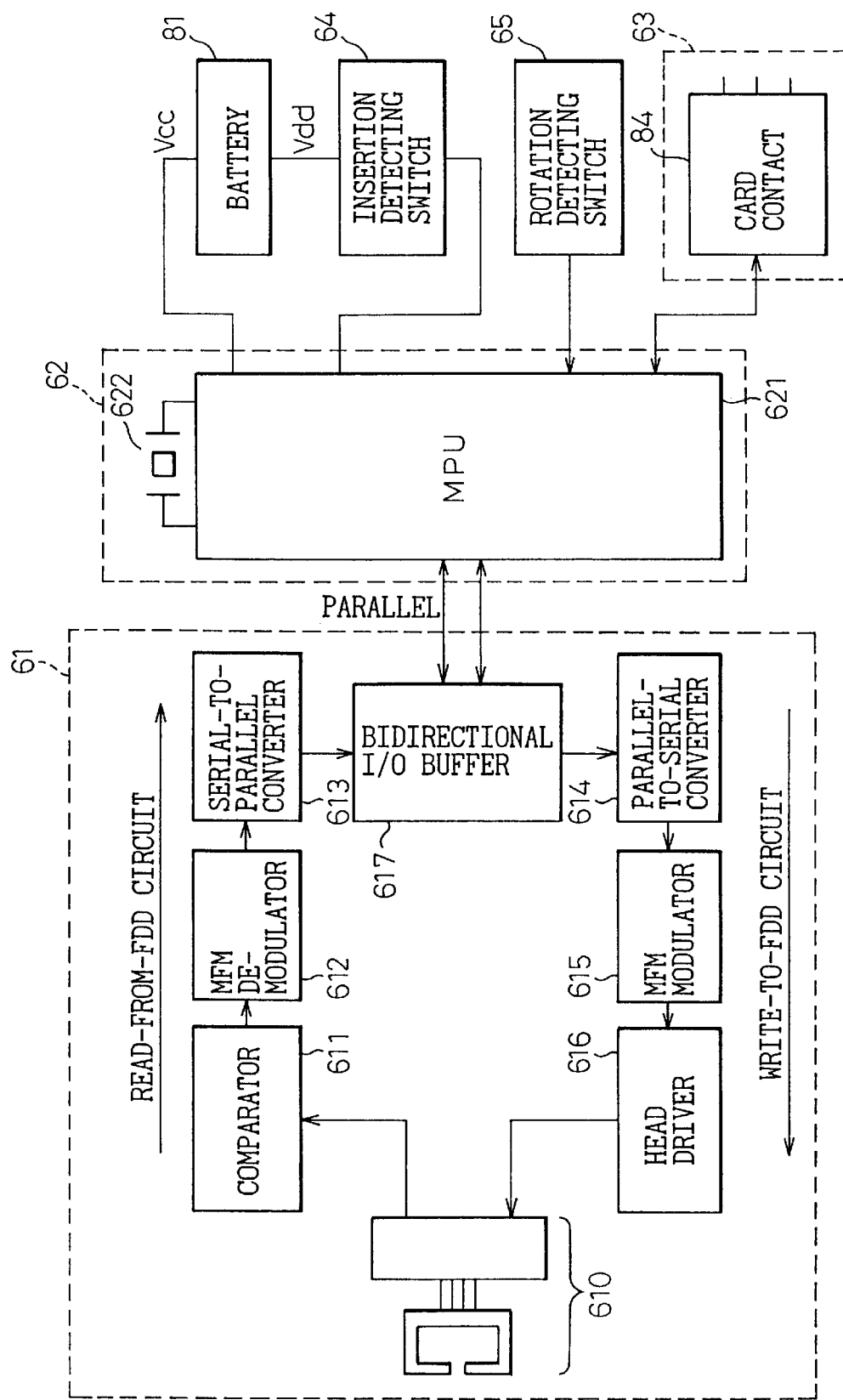

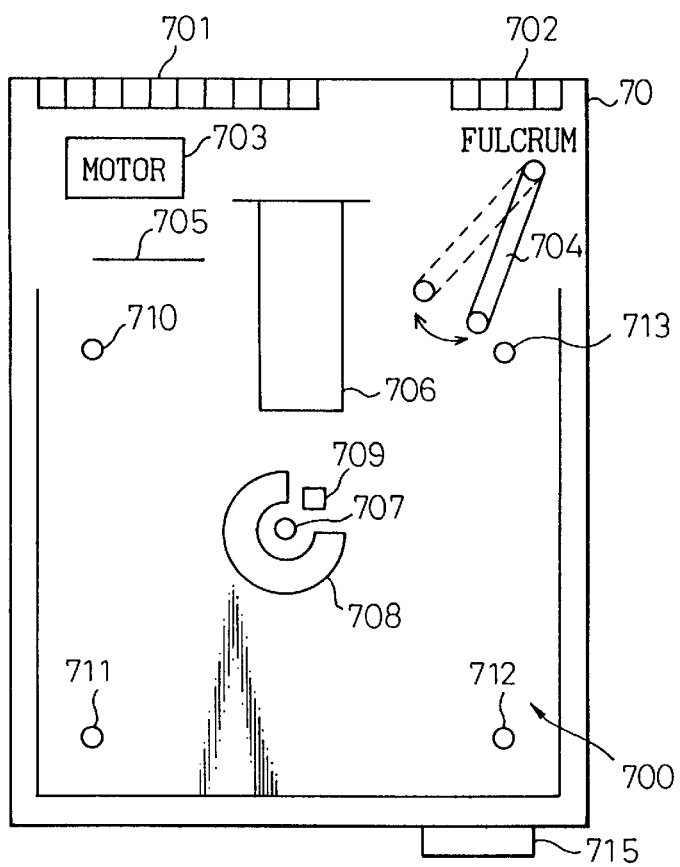
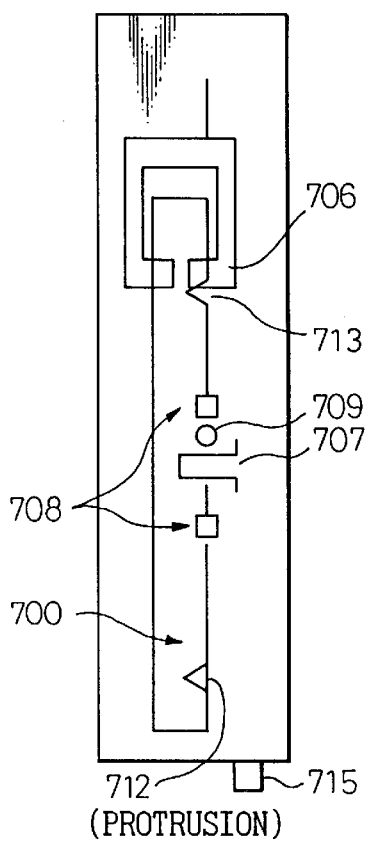
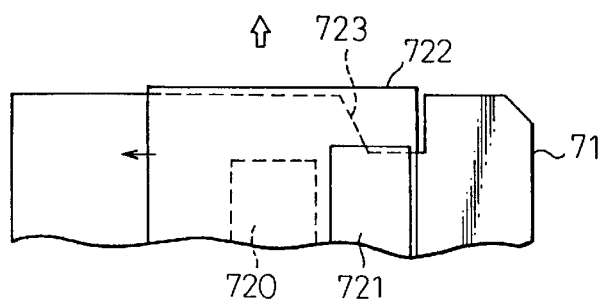

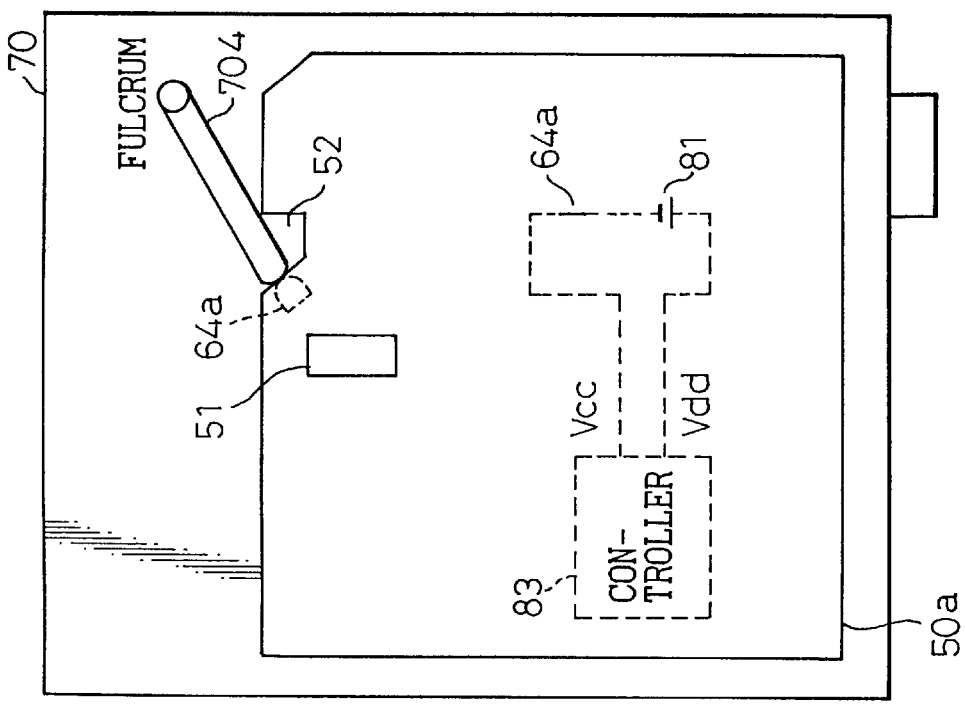
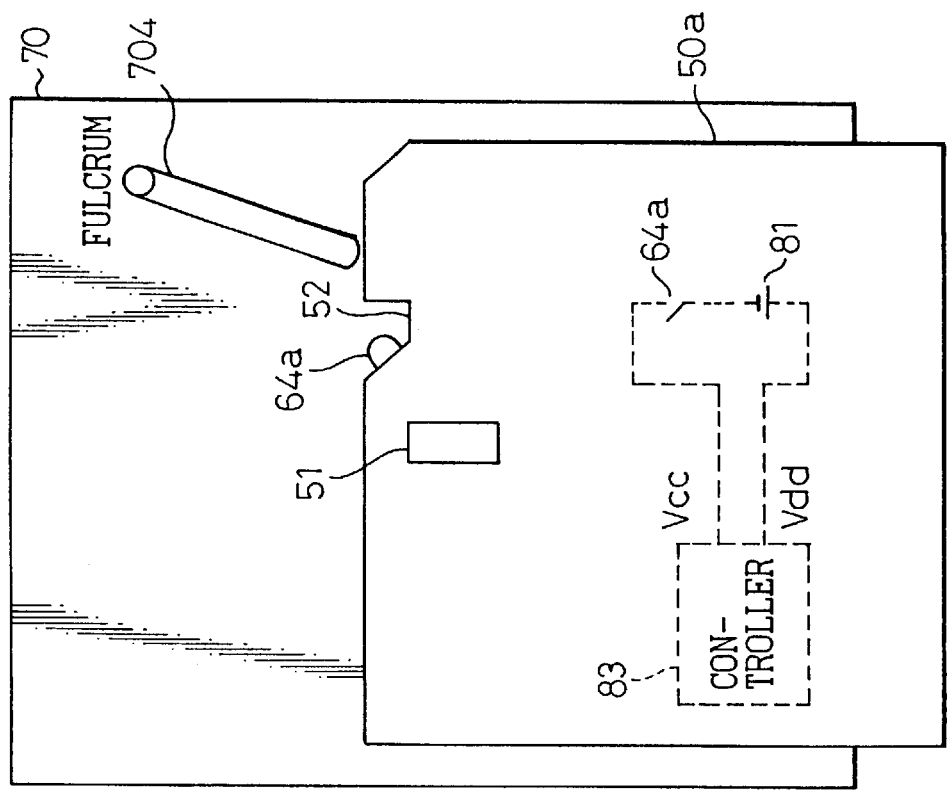

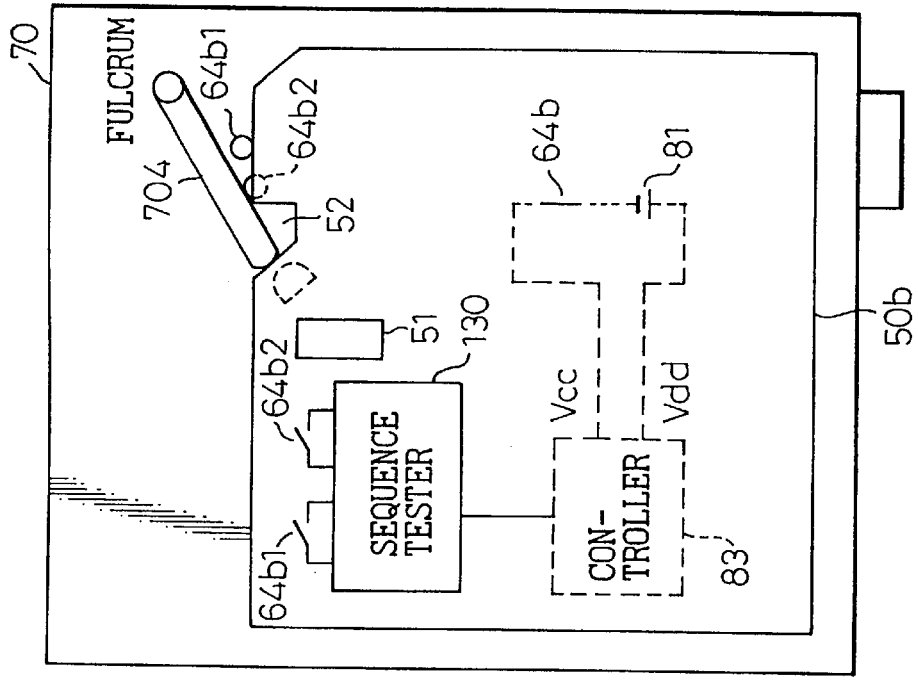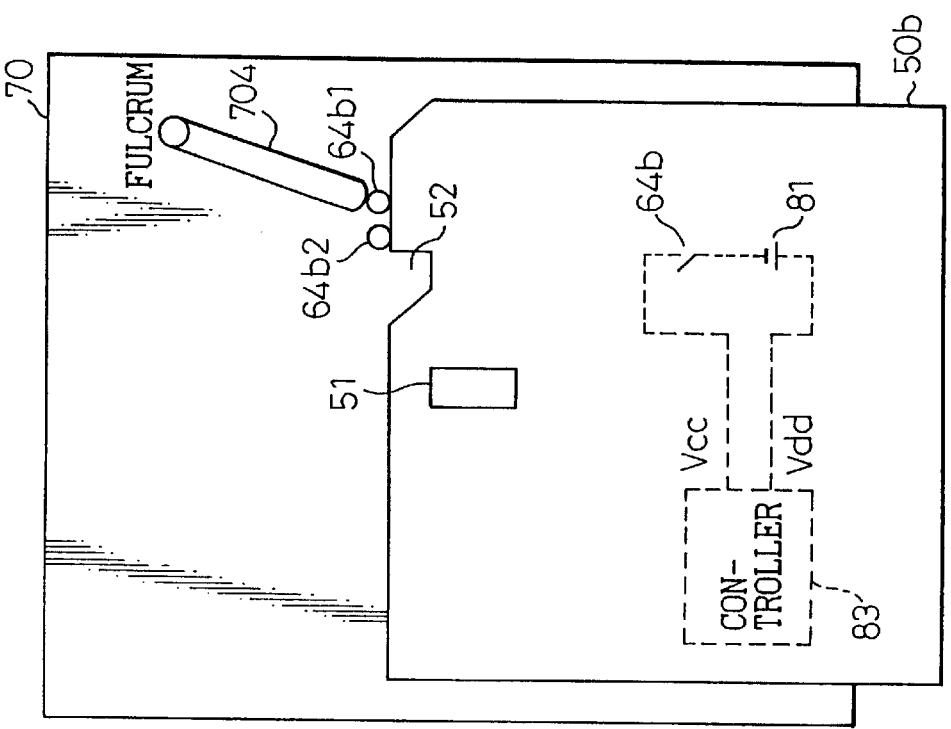

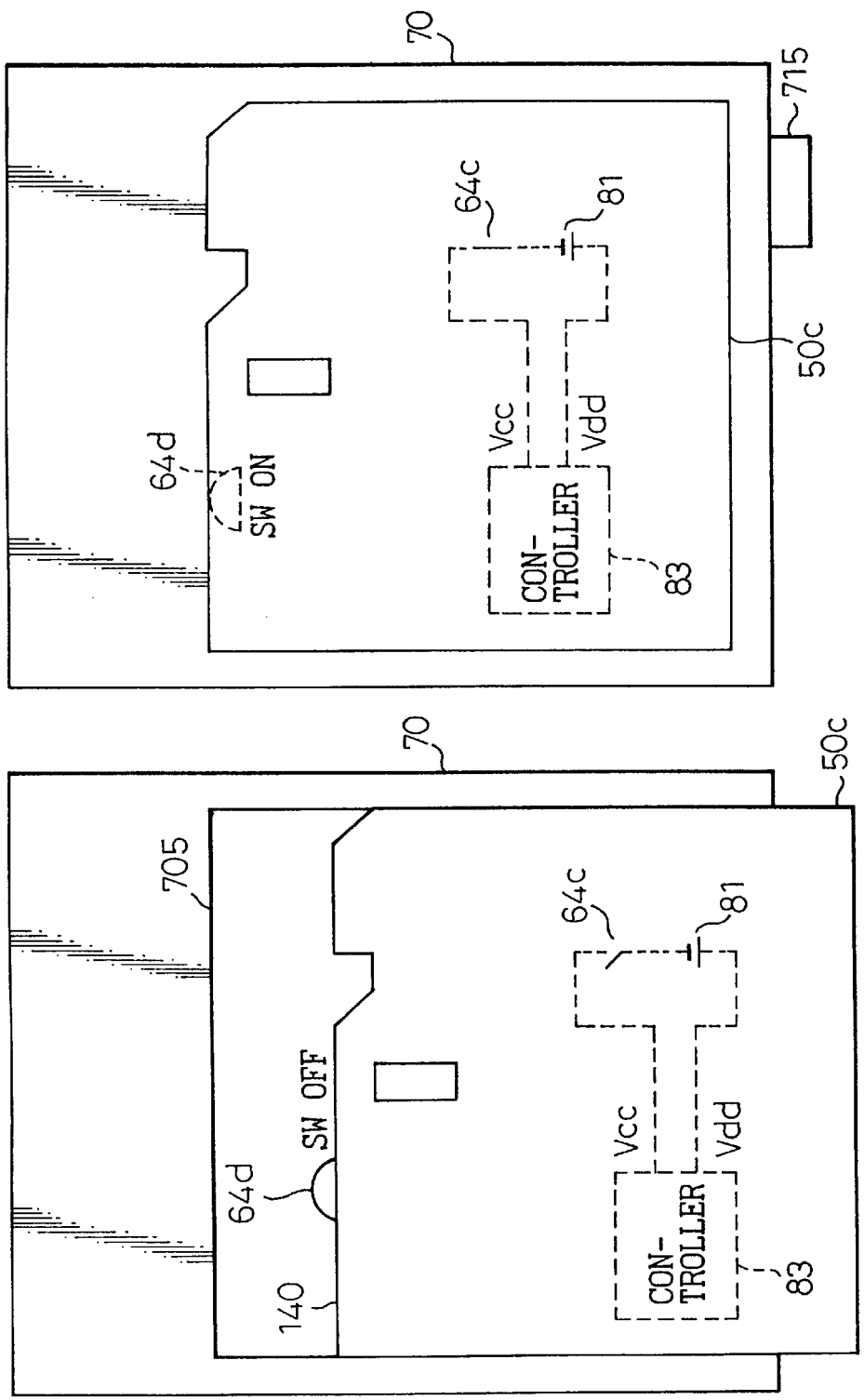

Fig.43(b)

ONE TURN = ONE CYCLE

ONE TURN OF MOTOR = ONE CYCLE

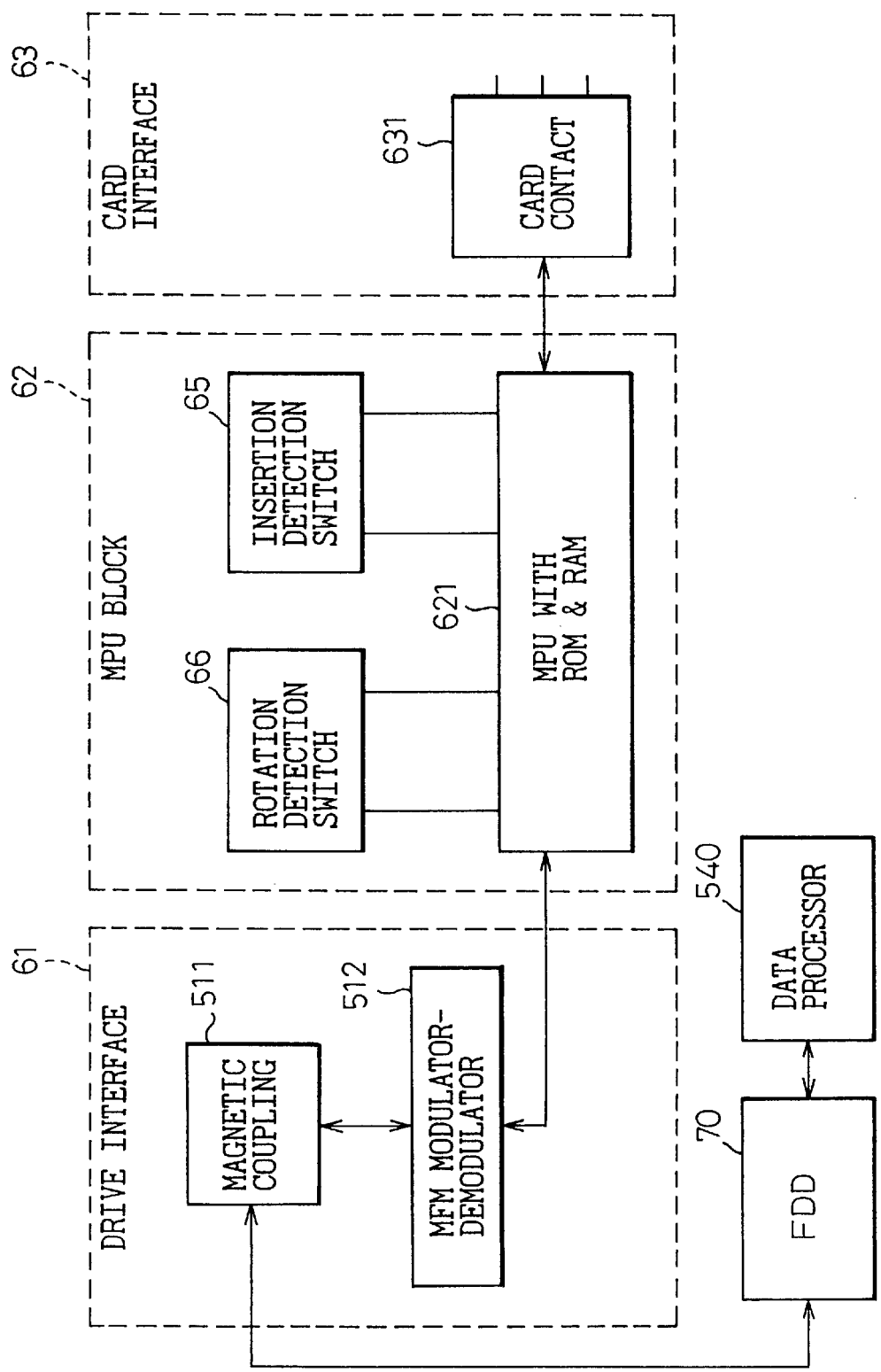

Fig. 52

| STATES OF ADAPTER (STATES OF MPU) | (a) DRIVE INTERFACE | (b) MPU | (c) CARD INTERFACE | OPERATION |
|---|---|---|---|---|
| ADAPTER BEING OUTSIDE FDD | — | — | — | |
| ↓ | | | | |
| SETTING ADAPTER INTO FDD | — | ○ | — | SETTING ADAPTER INTO FDD AND ACTIVATING MPU (PRIMARY DETECTION) |
| ↓ | | | | |
| → DETECTING ROTATION | ○ | ○ | — | DETECTING ACCESS FROM FDD (SECONDARY DETECTION) AND ACTIVATING DRIVE INTERFACE |
| ↓ | | | | |
| → RECEIVING COMMANDS | ○ | ○ | — | RECEIVING COMMANDS FROM FDD |
| ↓ | | | | |
| ACCESSING IC CARD | ○ | ○ | ○ | ACTIVATING CARD INTERFACE AND CARRYING OUT PROCESSES SUCH AS READ AND WRITE PROCESSES |
| ↓ | | | | |
| SENDING RESPONSE | ○ | ○ | — | STOPPING POWER SUPPLY TO CARD INTERFACE ON COMPLETION OF PROCESSES AND SENDING NOTICE TO FDD |
| ↓ | | | | |
| DETECTING FDD STOPPAGE | — | ○ | — | DETECTING STOPPAGE OF ACCESS FROM FDD (SECONDARY DETECTION) AND STOPPING POWER SUPPLY TO DRIVE INTERFACE |
| ↓ | | | | |
| EJECTING ADAPTER | — | — | — | EJECTING ADAPTER FROM FDD (PRIMARY DETECTION) AND STOPPING POWER SUPPLY |

NOTE: "○" INDICATES A POWER SUPPLIED STATE AND "—" A POWER STOPPED STATE.

Fig.53

| STATES OF ADAPTER (STATES OF MPU) | (a) DRIVE INTERFACE | (b) MPU | (c) CARD INTERFACE | OPERATION |
|---|---|---|---|---|
| ADAPTER BEING OUTSIDE FDD | — | — | — | |
| ↓ SETTING ADAPTER INTO FDD | — | ○ | — | SETTING ADAPTER INTO FDD AND ACTIVATING MPU (PRIMARY DETECTION) |
| ↓ DETECTING ROTATION | ○ | ○ | — | DETECTING ACCESS FROM FDD (SECONDARY DETECTION) AND ACTIVATING DRIVE INTERFACE |
| ↓ ↑ RECEIVING COMMANDS | ○ | ○ | — | RECEIVING COMMANDS FROM FDD |
| ↓ ACCESSING IC CARD | — | ○ | ○ | ACTIVATING CARD INTERFACE AND CARRYING OUT PROCESSES SUCH AS READ AND WRITE PROCESSES |
| ↓ DETECTING FDD STOPPAGE ⌇ | ○ | ○ | ○ | DETECTING FDD ACCESS STOPPAGE (SECONDARY DETECTION), STOPPING DRIVE INTERFACE, AND KEEPING CARD INTERFACE ACTIVE |
| ↓ DETECTING FDD RESTART | ○ | ○ | ○/— | DETECTING FDD ACCESS RESUMPTION (SECONDARY DETECTION) AND RESTARTING DRIVE INTERFACE |
| ↑ SENDING RESPONSE | ○ | ○ | — | STOPPING POWER SUPPLY TO CARD INTERFACE PROCESSES |
| ↓ DETECTING FDD STOPPAGE | — | ○ | — | AND SENDING NOTICE TO FDD DETECTING STOPPAGE OF ACCESS FROM FDD (SECONDARY DETECTION) AND STOPPING POWER SUPPLY TO DRIVE INTERFACE |
| ↓ EJECTING ADAPTER | — | — | — | EJECTING ADAPTER FROM FDD (PRIMARY DETECTION) AND STOPPING POWER SUPPLY |

Fig.54

| STATES OF ADAPTER (STATES OF MPU) | (a) DRIVE INTERFACE | (b) MPU | (c) CARD INTERFACE | OPERATION |
|---|---|---|---|---|
| ADAPTER BEING OUTSIDE FDD | — | — | — | |
| → RECEIVING COMMANDS | ○ | ○ | — | RECEIVING COMMANDS FROM FDD |
| ACCESSING IC CARD | ○ | ○ | ○ | ACTIVATING CARD INTERFACE AND CARRYING OUT PROCESSES SUCH AS READ AND WRITE PROCESSES |
| └ SENDING RESPONSE | ○ | ○ | — | STOPPING POWER SUPPLY TO CARD INTERFACE ON COMPLETION OF PROCESSES, SENDING NOTICE TO FDD, AND STARTING TIMER |
| FDD ROTATING | ○ | ○ | — | WAITING FOR NEXT COMMAND, OR WAITING FOR STOPPAGE OF FDD ROTATION |
| TIME-OUT | — | — | — | DETECTING TIME-OUT AND STOPPING POWER SUPPLY THROUGH MPU |

ADAPTER

This application is a continuation of Ser. No. 09/044,230 filed Mar. 19, 1998 now abandoned.

BACKGROUND OF THE INVENTION

1. Field of the Invention

The present invention relates to an adapter, and particularly to a disk-cartridge-type adapter having the same external shape as a disk cartridge such as a 3.5-inch FPD (floppy disk) cartridge. The adapter is used to handle an IC card or a semiconductor memory that stores various kinds of information such as electronic money information. The adapter is inserted into a disk cartridge drive such as a 3.5-inch FDD (floppy disk drive).

2. Description of the Related Art

Disk-cartridge-type adapters are disclosed in, for example, Japanese Examined Patent Publications No. 6-509194 and No. 7-86912.

FIG. 1 is a block diagram showing one of the adapters disclosed in the publications. The adapter 1a has the same external shape as a 3.5-inch FPD cartridge and incorporates a semiconductor memory 2a for storing, for example, electronic money data, a magnetic head 3, an opening 4 for making the head 3 face a magnetic head of an FDD (not shown), and a battery 5a for supplying power to the memory 2a.

The memory 2a employs the same data format as that of FPDS. The adapter 1a is inserted into the FDD so that data is transferred between the memory 2a and a data processor such as a personal computer.

FIG. 2 is a block diagram showing another of the adapters disclosed in the publications. The adapter 1b has the same external shape as a 3.5-inch FPD cartridge and incorporates an IC card 2b for storing, for example, electronic money data, a microprocessor (MPU) 6, a magnetic head 3, an opening 4 for making the head 3 face a magnetic head of an FDD, and a battery (or a generator) 5b for supplying power to the IC card 2b and MPU 6.

The adapter 1b is inserted into the FDD so that data is transferred between the IC card 2b and a data processor such as a personal computer. The MPU 6 converts data transferred from the data processor into data to be written into the IC card 2b, and data transferred from the IC card 2b into data to be transferred to the data processor.

These adapters 1a and 1b have no means to control the power sources 5a and 5b. A user must turn on the power source before using the adapter and turn off the same after removing the adapter from the FDD. If the power source is left on, the battery will be exhausted. The adapters have functional parts for transferring data between the adapters and a data processor and must supply power to these functional parts. If the adapters are kept active for a long time, the batteries will be quickly exhausted. The adapter of FIG. 2 employs the generator 5b instead of a battery. The generator needs a large space, and if the generator is made compact, it will generate insufficient power.

SUMMARY OF THE INVENTION

An object of the present invention is to provide an adapter that is free of trouble, has a simple structure, and consumes low power.

In order to accomplish the object, the present invention provides an adapter having an insertion detecting switch for detecting whether or not the adapter is completely inserted into a disk cartridge drive such as an FDD. If the switch detects complete insertion of the adapter, the adapter enables power supply from a power source, and if not, the adapter disables the same.

The insertion detecting switch may be configured to be pressed with a shutter opening/closing knob of the FDD.

The insertion detecting switch may be arranged at a front or rear end of the adapter so that it is pressed with a stopper or retainer of the FDD.

The insertion detecting switch may be configured to be pressed with a positioning boss of the FDD.

The insertion detecting switch may be configured to be pressed with a spindle of the FDD.

The insertion detecting switch may be configured to be pressed with a write-protect mechanism of the FDD.

The insertion detecting switch may be configured to be pressed with a double-density detecting mechanism of the FDD.

The present invention also provides an adapter having a rotation detecting switch for detecting whether or not a motor of an FDD is rotating. According to the output of the rotation detecting switch, the adapter determines whether or not the FDD is accessing the adapter and whether or not power must be supplied to functional blocks of the adapter.

The rotation detecting switch may be configured to be pressed with an-FPD drive pin connected to a spindle of the motor of the FDD.

The rotation detecting switch may have an optical sensor for detecting light that passes through a hole formed on a metal hub of the adapter that is attracted by a rotary magnet connected to the motor. The optical sensor may detect light that is intermittently blocked by a projection formed on the metal hub. The rotation detecting switch may have a mechanical switch that is turned on and off with the projection formed on the metal hub.

The adapter of the present invention may have both the insertion detecting switch and rotation detecting switch.

The adapter of the present invention may have functional blocks and both the insertion detecting switch and rotation detecting switch. According to the outputs of these switches, the adapter controls power supply to the functional blocks.

The adapter of the present invention may have functional blocks, both the insertion detecting switch and the rotation detecting switch, and a controller. If the insertion detecting switch detects complete insertion of the adapter into an FDD, the adapter supplies power from a power source to the controller, and if not, supplies no power to the controller. According to the output of the rotation detecting switch, the controller determines whether or not the FDD is accessing the adapter and whether or not power must be supplied to the functional blocks.

The adapter may stop power supply to a drive interface of the adapter if the motor of the FDD stops while the adapter is processing data according to commands from the FDD. If the motor restarts, the adapter resumes power supply to the drive interface.

If the motor of the FDD keeps rotating even after the adapter completes data processing, the adapter may forcibly turn off the power source a predetermined period after the completion of data processing.

The adapter may have an IC card socket for receiving an IC card that stores various kinds of information, and a card interface for communicating with the IC card. The controller of the adapter may only supply power, from the power source to the card interface when accessing the IC card.

The adapter may have a semiconductor memory instead of the IC card, for storing various kinds of information.

A battery serving as the power source of the adapter will not be exhausted when the adapter is not used, because the adapter enables power supply from the battery upon detecting complete insertion of the adapter into a disk cartridge drive and disables power supply from the battery upon detecting ejection of the adapter from the disk cartridge drive.

If the rotation detecting switch detects that a motor of the disk cartridge drive is not rotating, the adapter stops power supply to the drive interface. The adapter enables power supply to the drive interface only while the motor is rotating, to reduce consumption of the battery power.

BRIEF DESCRIPTION OF THE DRAWINGS

The above object and features of the present invention will be more apparent from the following description of the preferred embodiments when read in conjunction with the accompanying drawings, wherein:

FIG. 1 is a block diagram showing a disk-cartridge-type adapter according to a prior art;

FIG. 2 is a block diagram showing a disk-cartridge-type adapter according to another prior art;

FIG. 5 shows a structure of the adapter of FIG. 3;

FIG. 6 shows an electrical configuration of the adapter of FIG. 3;

FIGS. 8(a) and 8(b) are plan and right side views showing an internal structure of the FDD and a part of an FPD to be inserted into the FDD;

FIGS. 11(a) and 11(b) show the adapter of the first embodiment before and after insertion into the FDD;

FIGS. 13(a) and 13(b) show a disk-cartridge-type adapter according to a second embodiment of the present invention before and after insertion into the FDD;

FIGS. 16(a) and 16(b) show the adapter of the third embodiment before and after insertion into the FDD;

FIGS. 43(a) and 43(b) are plan and side views showing a modification of a metal hub of the adapter of the tenth embodiment;

FIG. 51 is a block diagram showing functional blocks of a disk-cartridge-type adapter according to a thirteenth embodiment of the present invention;

FIG. 52 shows power supply conditions according to the thirteenth embodiment;

FIG. 53 shows other power supply conditions according to the thirteenth embodiment;

FIG. 54 shows other power supply conditions according to the thirteenth embodiment.

DESCRIPTION OF THE PREFERRED EMBODIMENTS

Figure 3:
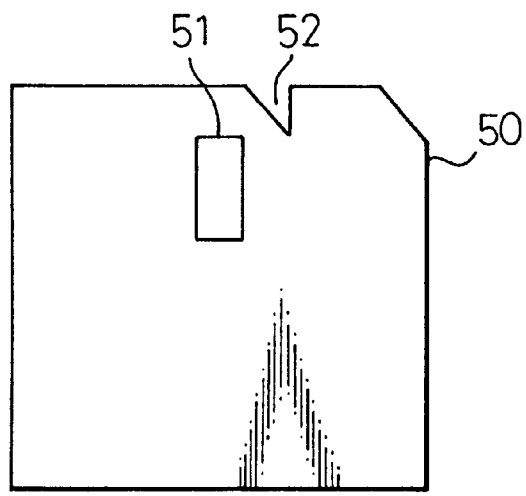
FIG. 3 is a plan view showing the surface of a disk-cartridge-type adapter having the same shape as a 3.5 inch FPD, according to the present invention.

In the following explanation, each disk-cartridge-type adapter has the same shape as a 3.5-inch FPD, and a disk cartridge drive is an FDD for driving the 3.5-inch FPD. Like reference numerals represent like parts through the drawings.

The basic structures of the FDD and a disk-cartridge-type adapter of the present invention will be explained with reference to FIGS. 3 to 8.

FIG. 3 shows the surface of the adapter 50 having the same shape as the 3.5-inch FPD that is based on international standards. The adapter 50 has a head 51. In the case of the FPD, the head thereof is covered with a shutter when the FPD is outside the FDD so that no dust enters the head. When the FPD is inserted into the FDD, the shutter is opened to magnetically engage the FPD with a magnetic head of the FDD. Although FPDs are always provided with a shutter, the adapter 50 of the present invention is not always provided with a shutter. The adapter 50 has a cut 52 to receive a shutter opening/closing knob of the FDD. The knob opens the shutter when the adapter 50 is inserted into the FDD. Even if the adapter 50 has no shutter, it must have the cut 51 so that the adapter 50 may have the same shape as the FPD.

Figure 4:
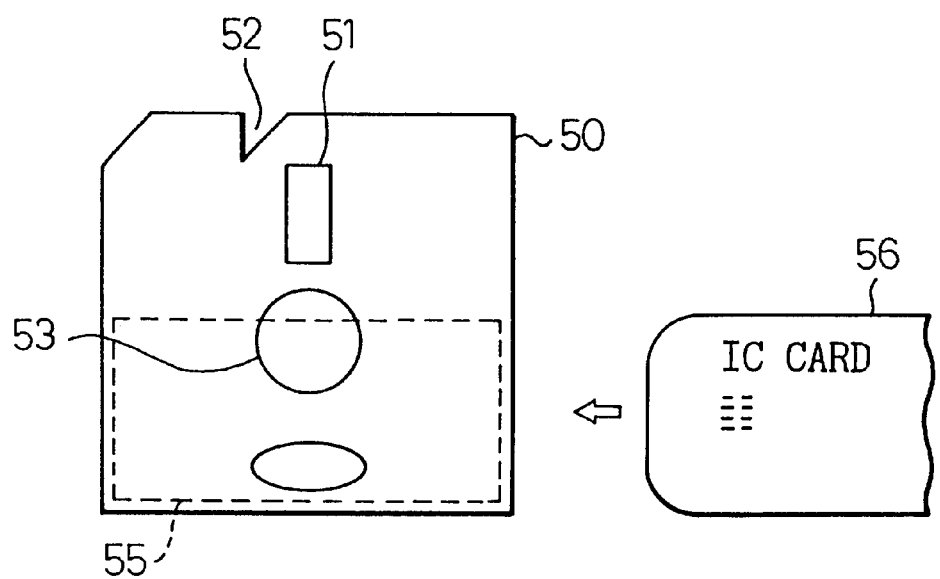
FIG. 4 shows the back face of the adapter of FIG. 3.

FIG. 4 shows the back face of the adapter 50. The adapter 50 has a circular recess 53. The FPD has an equivalent circular recess to receive a circular metal hub, which is attracted by a magnet that rotates together with a spindle driven by a motor of the FDD. The recess 53 of the adapter 50 may have or not a metal hub. The adapter 50 has an IC card socket 55 for receiving an IC card 56.

FIG. 5 shows the details of the adapter 50. The adapter 50 has a battery 81, an MFM (modified FM) modulator-demodulator 82, an MPU 83, and a card contact 84. The MPU 83 has a ROM for storing a program to control data communication between the IC card 56 and the FDD 70, and a RAM for temporarily storing data to be transferred between the IC card 56 and the FDD 70. The card contact 84 is used to write from and read to the IC card 56.

FIG. 6 shows an electrical configuration of the adapter 50. The adapter 50 has a drive interface 61 for communicating with the FDD 70, an MPU block 62, and a card interface 63 for communicating with the IC card 56. The drive interface 61 has a head 610, a read-from-FDD circuit, and a write-to-FDD circuit.

The read-from-FDD circuit includes a comparator 611, an MFM demodulator 612, and a serial-to-parallel converter 613. The write-to-FDD circuit includes a parallel-to-serial converter 614, an MFM modulator 615, and a head driver 616. The output of the converter 613 is supplied to a bidirectional I/O buffer 617. The output of the buffer 617 is supplied to the converter 614. The buffer 617 carries out bidirectional communication with an MPU 621 in the MPU block 62.

The MPU block 62 has the MPU 621 and a clock unit 622 for controlling the MPU 621.

The card interface 63 has a card contact 631 that is electrically connected to the IC card 56.

An insertion detecting switch 64 and a rotation detecting switch 65 are characteristic to the present invention and are connected to the MPU 621.

The operation of the adapter 50 will be explained. Data transfer between the IC card 56 and the MPU 621 is serially made through the card contact 631. Data transfer between the MPU 621 and the FDD 70 is made with magnetic coupling through the MFM demodulator 612 and MFM modulator 615. The FDD 70 carries out data transfer with a data processor such as a personal computer.

If the insertion detecting switch 64 is ON, the MPU block 62 is connected to the battery 81 and receives power therefrom. If the switch 64 is OFF, the MPU block 62 is disconnected from the battery 81 and receives no power therefrom.

If the rotation detecting switch 65 is ON, the MPU block 62 supplies power from the battery 81 to the drive interface 61. If the switch 65 is OFF, the MPU block 62 supplies no power to the drive interface 61.

When accessing the IC card 56, the MPU 621 supplies power from the battery 81 to the card interface 63, and when not accessing the IC card 56, stops power supply to the card interface 63.

Figure 7A:
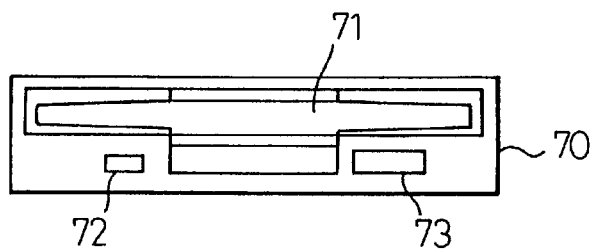
FIG. 7(a) is a front view showing an FDD into which the adapter of FIG. 3 is inserted.
Figure 7B:
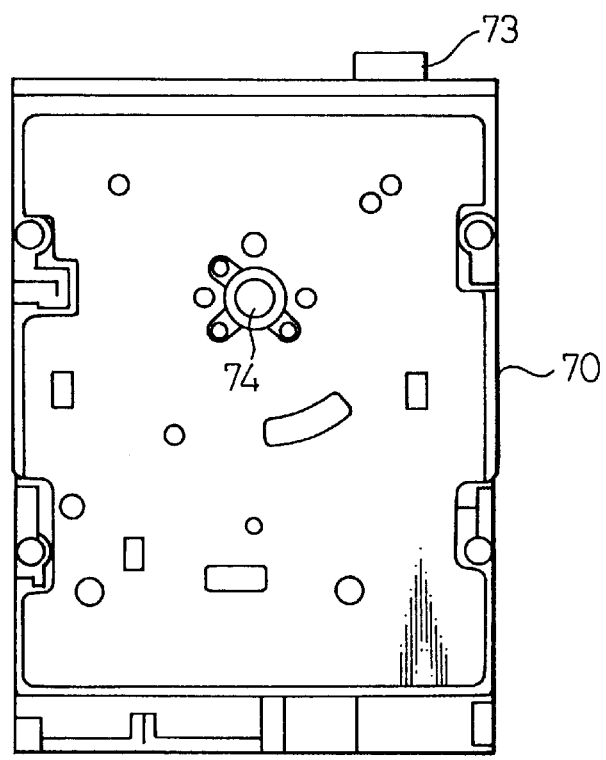
FIGS. 7(b) and 7(c) are sectional and side views showing the FDD.
Figure 7C:

FIG. 7(a) is a front view showing the FDD 70 into which the adapter 50 or FPD is inserted, FIG. 7(b) is a horizontal cross section showing the FDD 70, and FIG. 7(c) is a side view showing the FDD 70. The FDD 70 has an insertion slot 71 into which the adapter 50 or FPD is inserted, an LED 72 that lights up when the FDD 70 operates, and an eject button 73 that is pushed to eject the adapter 50 or FPD from the FDD 70.

A spindle 74 is driven by a motor. A magnet (not shown) is attached to the tip of the spindle 74, to attract the metal hub on the back face of the FPD.

FIG. 8(a) is a plan view showing the internal structure of the FDD 70 and a part of an FPD 71 to be inserted into the FDD 70, and FIG. 8(b) is a right side view showing them. The FDD 70 has a housing 700 for receiving the FPD 71 or adapter 50, a signal interface 701 for transferring signals to and from a data processor (not shown) such as a personal computer, and a power source interface 702.

The motor 703 rotates a magnetic disk stored in the FPD 71. The FPD 71 has a head 720 and a shutter 722 that covers the head 720. When the FPD 71 is inserted into the FDD 70, the tip of a shutter opening/closing knob 704 slides along a cut 723 and opens the shutter 722. When the FPD 71 is removed from the FDD 70, the shutter 722 closes.

A stopper 705 stops a front end of the FPD 71. A head 706 is used to read and write the FPD 71. The motor 703 drives the spindle 707 and C-shaped magnet 708 that attracts the metal hub (not shown) on the back face of the FPD 71, to surely rotate the magnetic disk contained in the FPD 71. A drive pin 709 engages with a hole formed on the metal hub of the FPD 71, to surely rotate the magnetic disk in the FPD 71. FPD positioning bosses 710 and 713 fix the position of the FPD 71 in the FDD 70. A double-density detecting mechanism 711 determines whether the FPD 71 is 2HD or 2DD. A write-protect detecting mechanism 712 determines whether or not the FPD 71 is write-protected. An eject button 715 is used to eject the FPD 71 from the FDD 70.

The FPD 71 has a window 721. When the FPD 71 is inserted into the FDD 70, the knob 704 moves the shutter 722 leftward as indicated with an arrow mark in FIG. 8(a). As a result, the head 720 overlaps the window 721 and faces the head 706 of the FDD 70.

Next, preferred embodiments of the present invention will be explained.

First Embodiment

Figure 9:
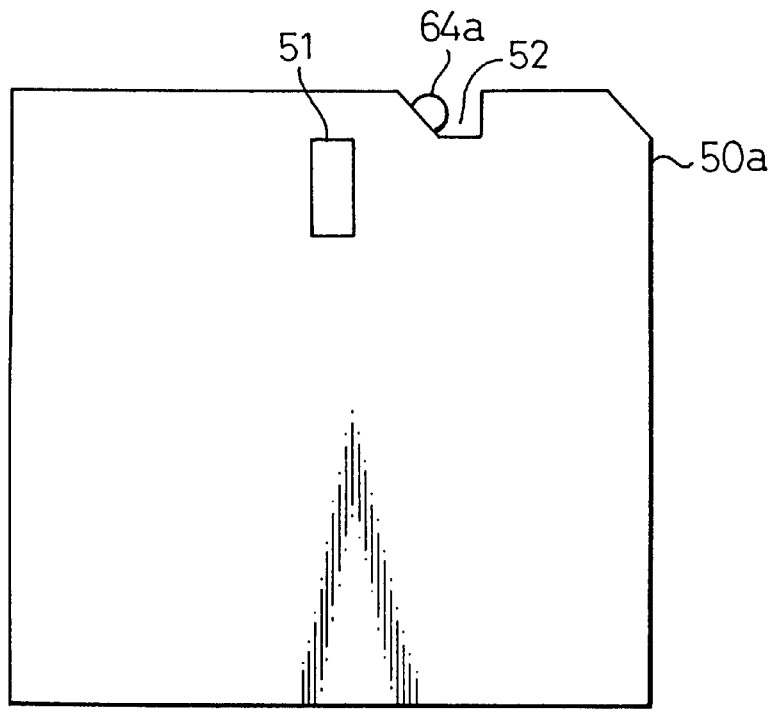
FIG. 9 shows a disk-cartridge-type adapter according to a first embodiment of the present invention.

FIG. 9 shows a disk-cartridge-type adapter 50a according to the first embodiment of the present invention. The adapter 50a has a push button switch 64a at a cut 52. The switch 64a is positioned where the tip of the knob 704 of the FDD 70 rests when the adapter 50a is completely inserted into the FDD 70. The switch 64a is supported with a resilient member such as a spring so that the switch 64a may retract in the adapter 50a when pushed and return to the original position when no force is applied thereto.

Figure 10:
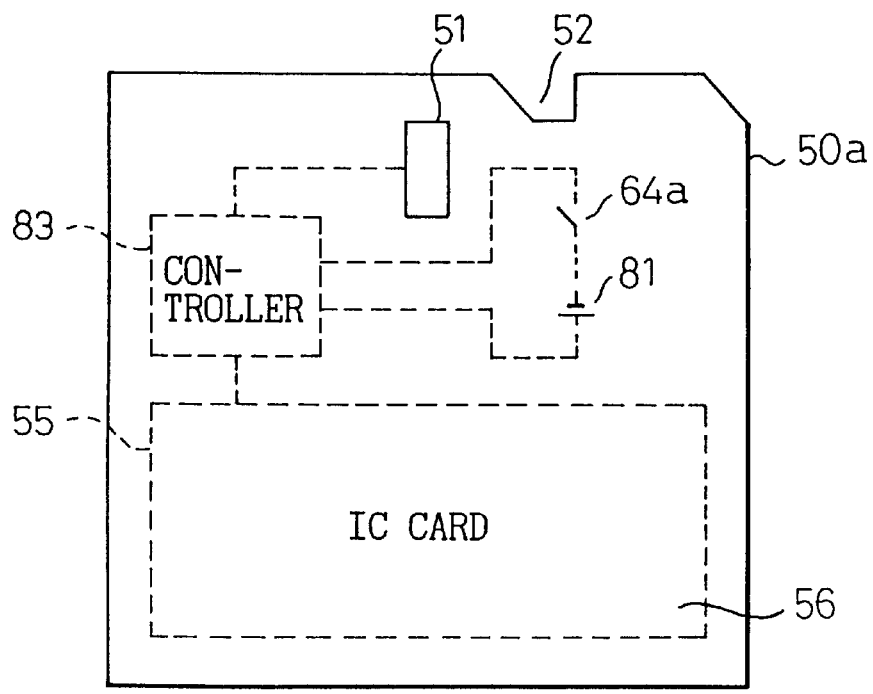
FIG. 10 shows an electrical configuration of the adapter of the first embodiment.

FIG. 10 shows an electrical configuration of the adapter 50a. When the adapter 50a is outside the FDD 70, the switch 64a is OFF to supply no power from a battery 81 to a controller 83.

When the adapter 50a is inserted into the FDD 70, the switch 64a is pressed with the knob 704, to supply power from the battery 81 to the controller 83.

FIGS. 11(a) and 11(b) show the adapter 50a before and after complete insertion into the FDD 70. The knob 704 pushes the switch 64a, to supply power from the battery 81 to the controller 83.

Figure 12:
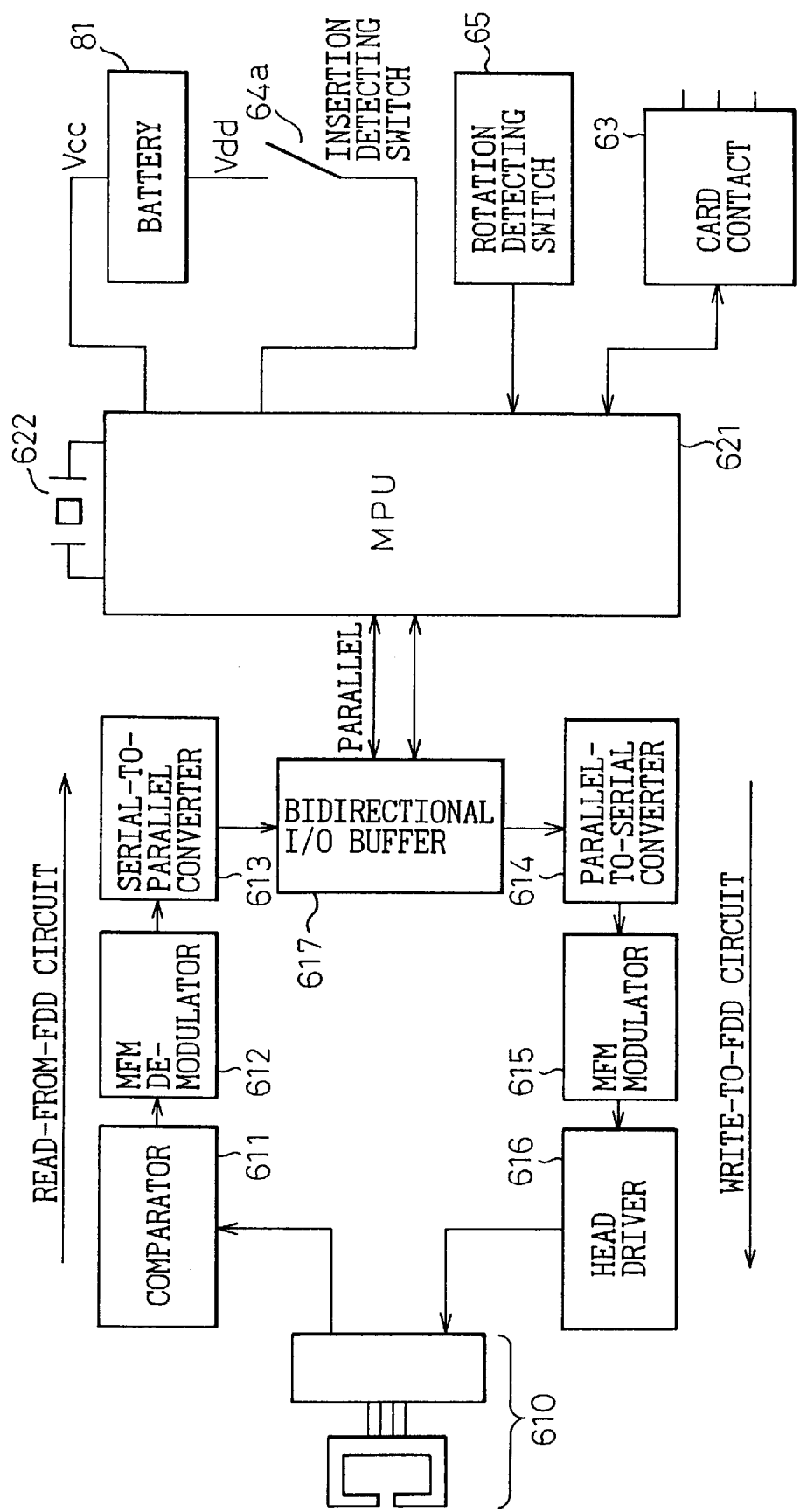
FIG. 12 shows the details of the adapter of the first embodiment.

FIG. 12 shows the details of the adapter 50a. The switch 64a serves as the insertion detecting switch 64 of FIG. 6.

When the switch 64a is turned on, power from the battery 81 is supplied to an MPU 621, and when the switch 64a is turned off, no power is supplied to the MPU 621. The MPU 621 corresponds to the controller 83 of FIGS. 11 (a) and 11(b).

Second Embodiment

FIGS. 13(a) and 13(b) show a disk-cartridge-type adapter 50b according to the second embodiment of the present invention before and after complete insertion into the FDD 70. The adapter 50b has two push button switches 64b1 and 64b2 at positions where the tip of the knob 704 of the FDD 70 passes. The switches 64b1 and 64b2 are preferably positioned at a front end of the adapter 50b beside a cut 52. If the switch 64b1 is pushed first and then the switch 64b2, a sequence tester 130 determines that the adapter 50b has been inserted into the FDD 70 and turns on a switch 64b to supply power from a battery 81 to a controller 83. If the switch 64b2 is pushed first and then the switch 64b1, the sequence tester 130 determines that the adapter 50b has been ejected from the FDD 70 and turns off the switch 64b to cut power supply from the battery 81 to the controller 83. The sequence tester 130 may have a small power source (not shown) or may always receive power from the battery 81.

Third Embodiment

Figure 14:
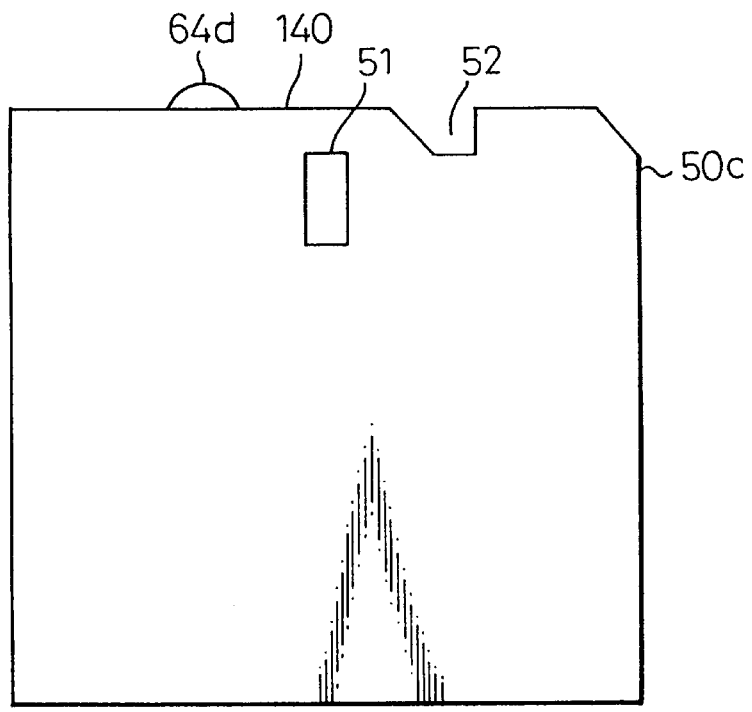
FIG. 14 shows a disk-cartridge-type adapter according to a third embodiment of the present invention.

FIG. 14 shows a disk-cartridge-type adapter 50c according to the third embodiment of the present invention. An insertion detecting switch 64c is arranged at an insertion front end 140 of the adapter 50c. When the adapter 50c is completely inserted into the FDD 70, the stopper 705 (FIG. 8(a)) of the FDD 70 stops the adapter 50c and pushes the switch 64c. The switch 64c is supported with a resilient member such as a spring so that it returns to the original position when no force is applied thereto.

Figure 15:
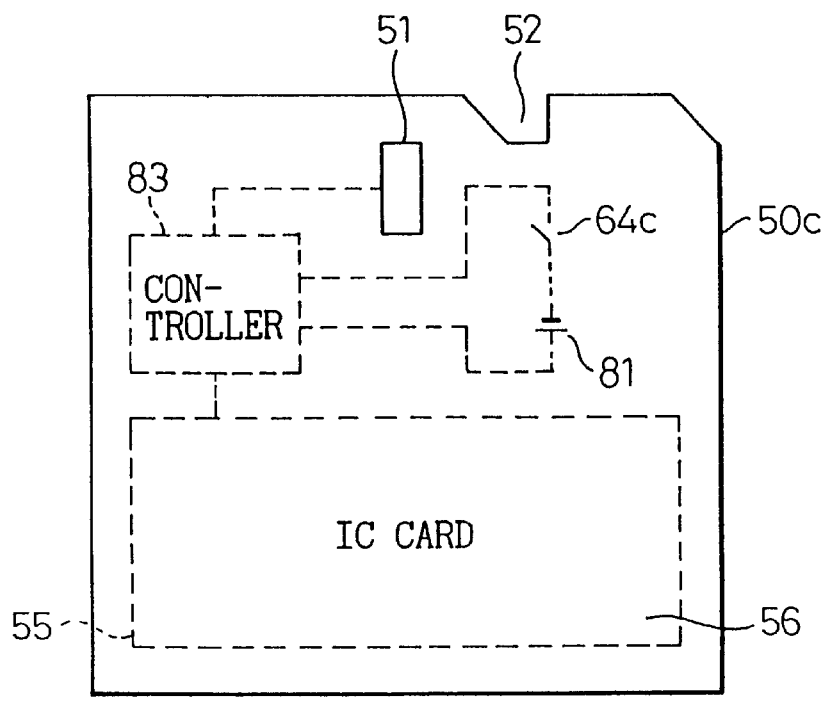
FIG. 15 shows an electrical configuration of the adapter of the third embodiment.

FIG. 15 shows an electrical configuration of the adapter 50c. When the adapter 50c is outside the FDD 70, the switch 64c is OFF to supply no power from a battery 81 to a controller 83.

When the adapter 50c is inserted into the FDD 70, the switch 64d is pressed with the stopper 705, to supply power from the battery 81 to the controller 83.

FIGS. 16(a) and 16(b) show the adapter 50c before and after complete insertion into the FDD 70. When the adapter 50c is completely inserted into the FDD 70, the switch 64c is pressed with the stopper 705, to supply power from the battery 81 to the controller 83.

Figure 17A:
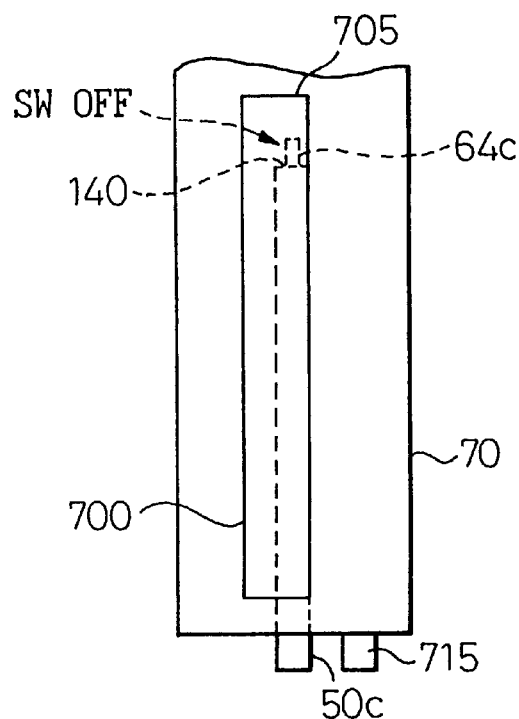
FIGS. 17(a) and 17(b) are perspective side views showing the adapter of the third embodiment before and after insertion into the FDD.
Figure 17B:
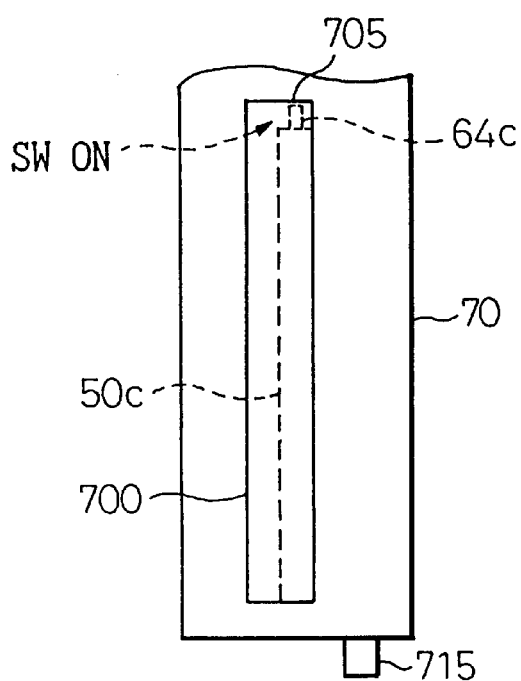

FIGS. 17(a) and 17(b) are perspective side views showing the adapter 50c before and after complete insertion into the FDD 70. When the adapter 50c is completely inserted into the housing 700 of the FDD 70, the switch 64c is pressed with the stopper 705, to supply power from the battery 81 to the controller 83.

Fourth Embodiment

Figure 18:
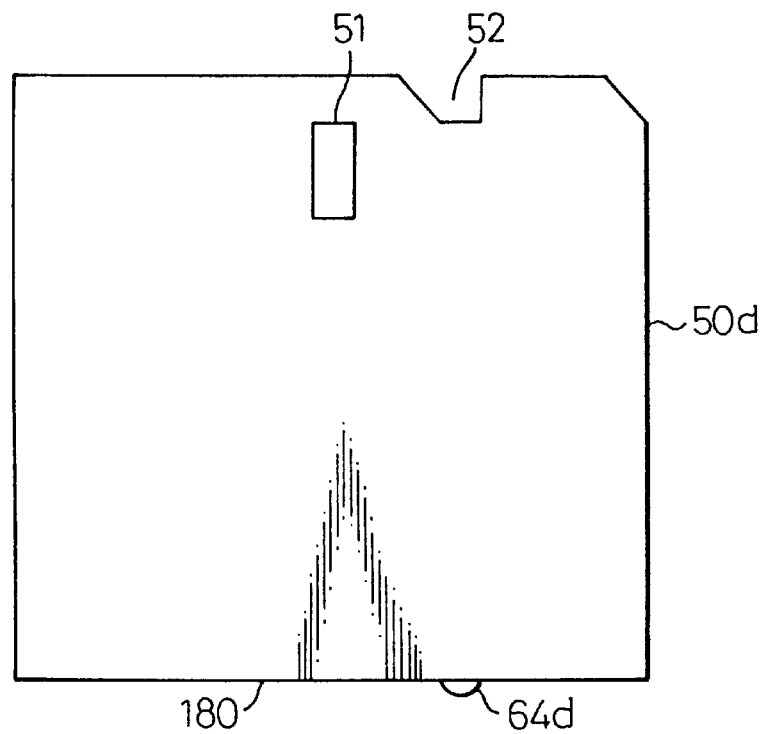
FIG. 18 shows a disk-cartridge-type adapter according to a fourth embodiment of the present invention.

FIG. 18 shows a disk-cartridge-type adapter 50d according to the fourth embodiment of the present invention. The adapter 50d has an insertion detecting switch 64d arranged at an insertion rear end of the adapter 50d. When the adapter 50d is inserted into the FDD 70, the switch 64d is pressed by a retainer of the FDD 70. The FDD 70 has a mechanism for dropping and accommodating an FPD. After the FPD is inserted into the FDD 70 in parallel, the rear end of the FPD is dropped and obliquely set with respect to the FDD 70 so that the FPD may not escape from the housing 700 of the FDD 70 unless the eject button 715 is pushed. A wall of the housing 700 at the FPD insertion slot of the FDD 70 serves as the retainer. The switch 64d is supported with a resilient member such as a spring so that it returns to the original position when no force is applied thereto.

Figure 19:
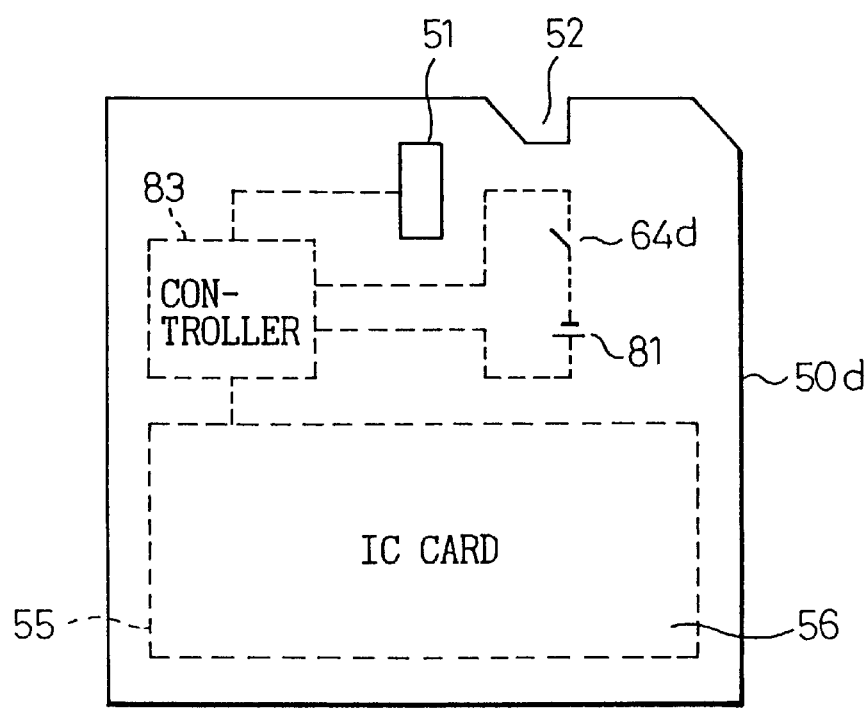
FIG. 19 shows an electrical configuration of the adapter of the fourth embodiment.

FIG. 19 shows an electrical configuration of the adapter 50d. When the adapter 50d is outside the FDD 70, the switch 64d is OFF to supply no power from a battery 81 to a controller 83.

When the adapter 50d is inserted into the FDD 70, the switch 64d is pressed with the retainer, to supply power from the battery 81 to the controller 83.

Figure 20B:
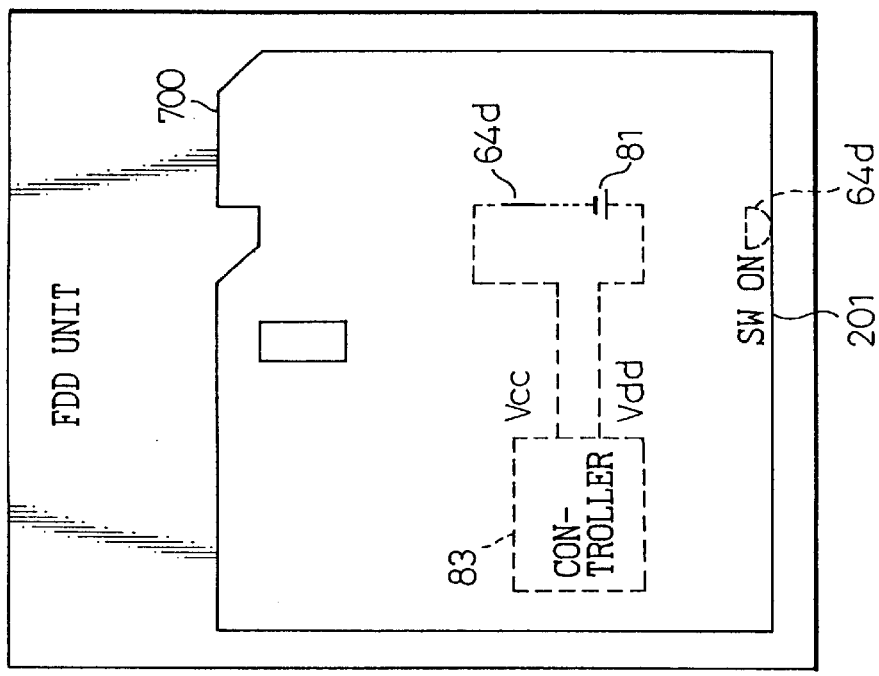
FIGS. 20(a) and 20(b) show the adapter of the fourth embodiment before and after insertion into the FDD.
Figure 20A:
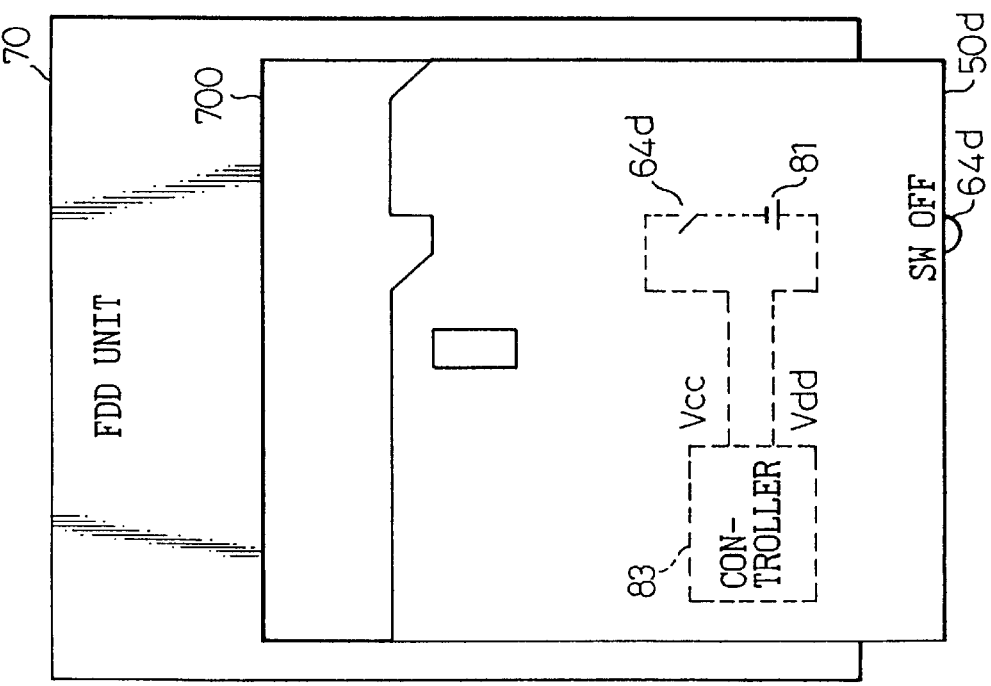

FIGS. 20(a) and 20(b) show the adapter 50d before and after complete insertion into the FDD 70. When the adapter 50d is completely inserted into the FDD 70, the switch 64d is pressed with the retainer 201 of the FDD 70, to supply power from the battery 81 to the controller 83.

Figure 21A:
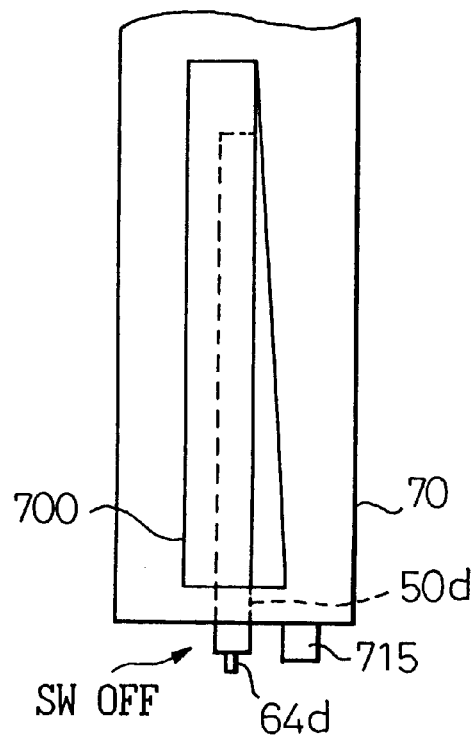
FIGS. 21(a) and 21(b) are perspective side views showing the adapter of the fourth embodiment before and after insertion into the FDD.
Figure 21B:
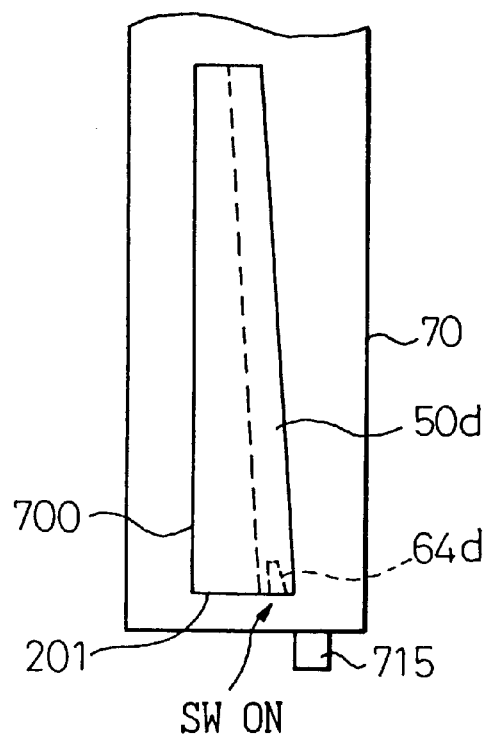

FIGS. 21(a) and 21(b) are perspective side views showing the adapter 50d before and after complete insertion into the FDD 70. When the adapter 50*d* is completely inserted into the housing 700 of the FDD 70, the rear end of the adapter 50*d* is dropped and accommodated in the housing 700. As a result, the switch 64*d* is pressed with the retainer 201, to supply power from the battery 81 to the controller 83.

Fifth Embodiment

Figure 22:
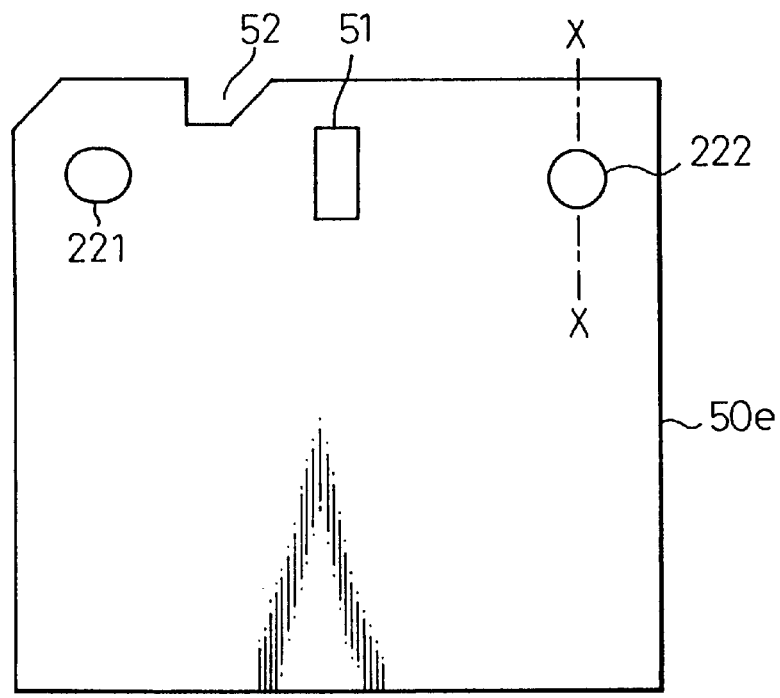
FIG. 22 shows a disk-cartridge-type adapter according to a fifth embodiment of the present invention.

FIG. 22 shows a disk-cartridge-type adapter 50*e* according to the fifth embodiment of the present invention. The adapter 50*e* has an insertion detecting switch 64*e* (FIG. 24) arranged in one of positioning holes 221 and 222. When the adapter 50*e* is completely inserted into the FDD 70, the switch 64*e* is pressed with a corresponding one of the positioning bosses 710 and 713 of the FDD 70. The switch 64*e* is supported with a resilient member such as a spring so that it returns to the original position when no force is applied thereto.

Figure 23:
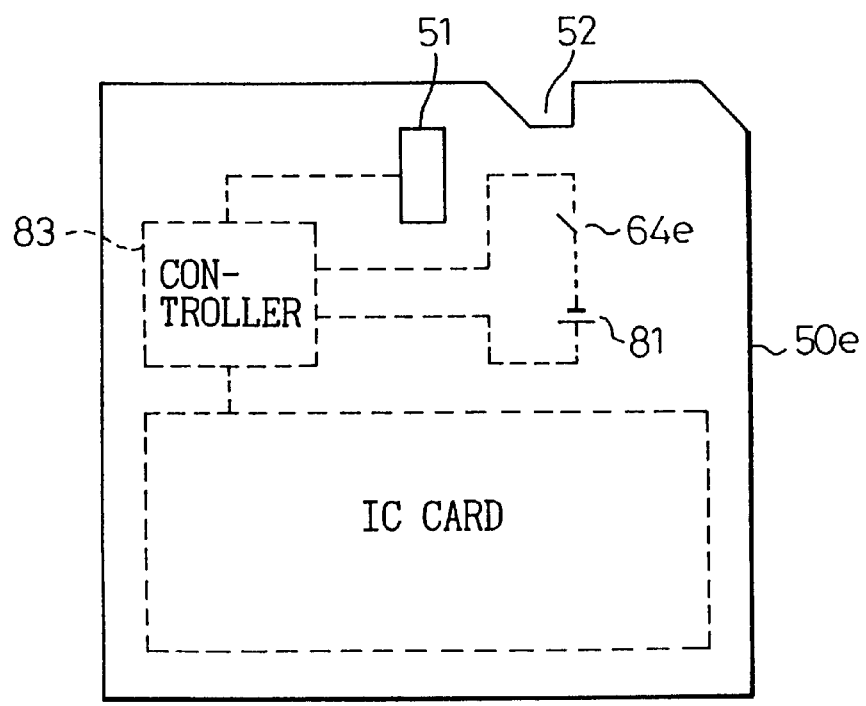
FIG. 23 shows an electrical configuration of the adapter of the fifth embodiment.

FIG. 23 shows an electrical configuration of the adapter 50*e*. When the adapter 50*e* is outside the FDD 70, the switch 64*e* is OFF to supply no power from a battery 81 to a controller 83.

When the adapter 50*e* is inserted into the FDD 70, the switch 64*e* is pressed with one of the bosses 710 and 713, to supply power from the battery 81 to the controller 83.

Figure 24A:
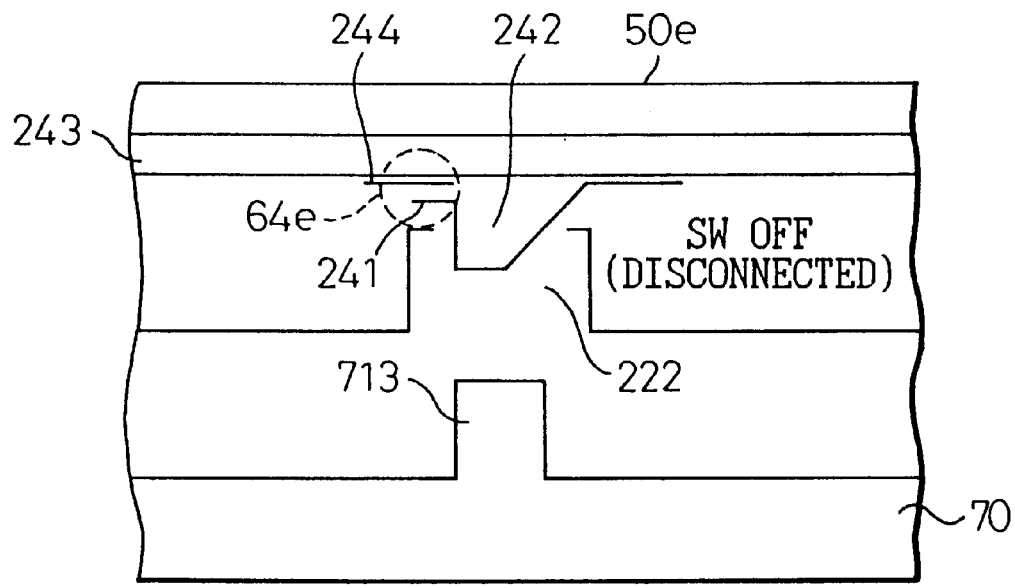
FIGS. 24(a) and 24(b) are partial sectional views taken along a line X—X of FIG. 22, showing the adapter of the fifth embodiment before and after insertion into the FDD.
Figure 24B:
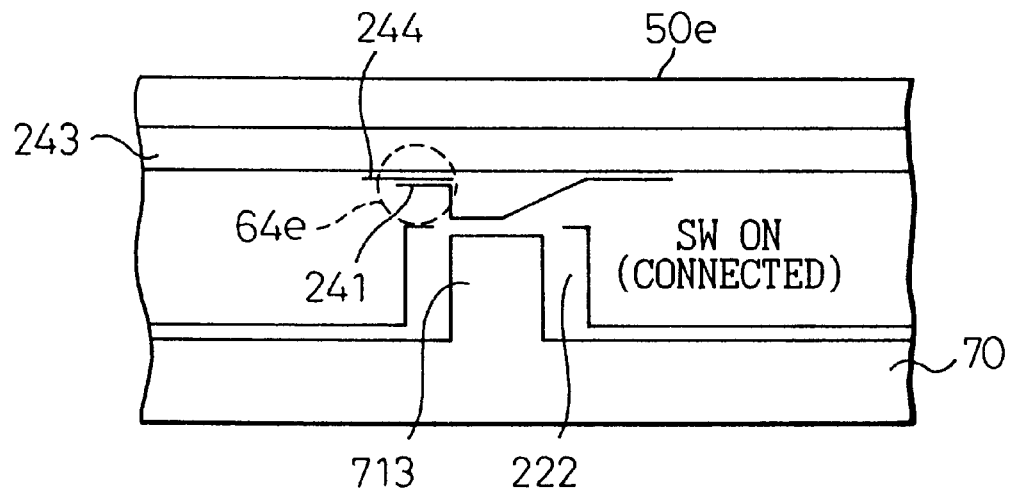

FIGS. 24(*a*) and 24(*b*) are partial sectional views taken along a line X—X of FIG. 22, showing the adapter 50*e* before and after complete insertion into the FDD 70. The adapter 50*e* has the positioning hole 222, which is provided with a hole 242 in which a contact 241 of the switch 64*e* is movable. The other contact 244 of the switch 64*e* is attached to a base 243 of the adapter 50*e*.

When the adapter 50*e* is outside the FDD 70, the contacts 241 and 244 are separated from each other. When the adapter 50*e* is completely inserted into the FDD 70, the boss 713 of the FDD 70 pushes the contact 241 against the contact 244, to supply power from the battery 81 to the controller 83.

When the adapter 50*e* is ejected from the FDD 70, the spring separates the contacts 241 and 244 from each other, to supply no power to the controller 83.

Sixth Embodiment

Figure 25:
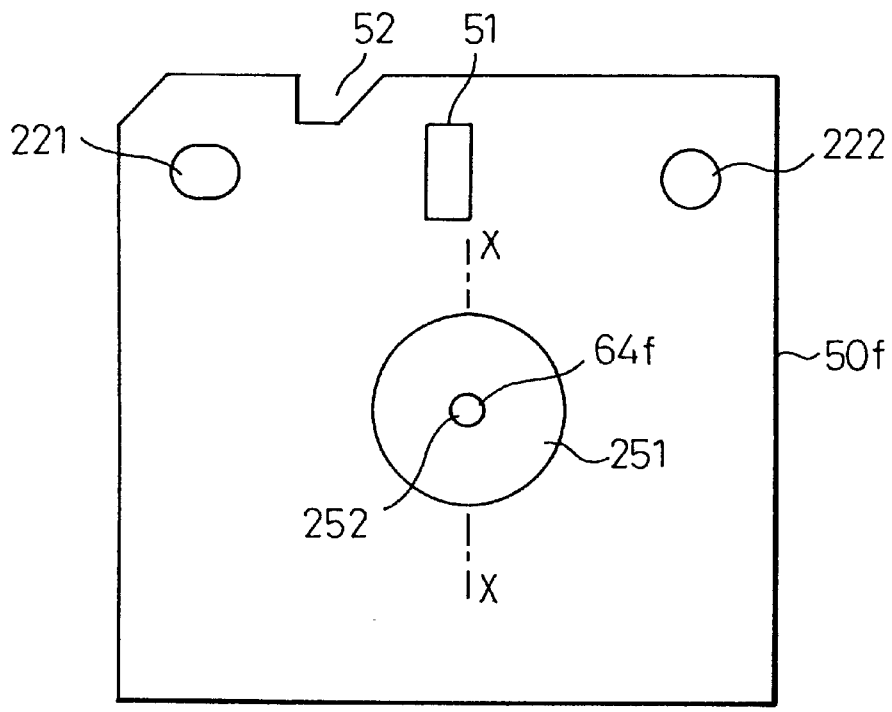
FIG. 25 shows a disk-cartridge-type adapter according to a sixth embodiment of the present invention.

FIG. 25 shows a disk-cartridge-type adapter 50*f* according to the sixth embodiment of the present invention. The adapter 50*f* has an insertion detecting switch 64*f* (FIG. 27) arranged at a position 252 that corresponds to the spindle 707 (FIG. 8) of the FDD 70. The spindle 707 rotates an FPD when the FPD is inserted into the FDD 70. The adapter 50*f* has a recess 251 that corresponds to a position for installing a metal hub in the case of the FPD. The adapter 50*f* has no metal hub. When the adapter 50*f* is inserted into the FDD 70, the switch 64*f* is pressed with the tip of the spindle 707. The switch 64*f* is supported with a resilient member such as a spring so that it returns to the original position when no force is applied thereto.

Figure 26:
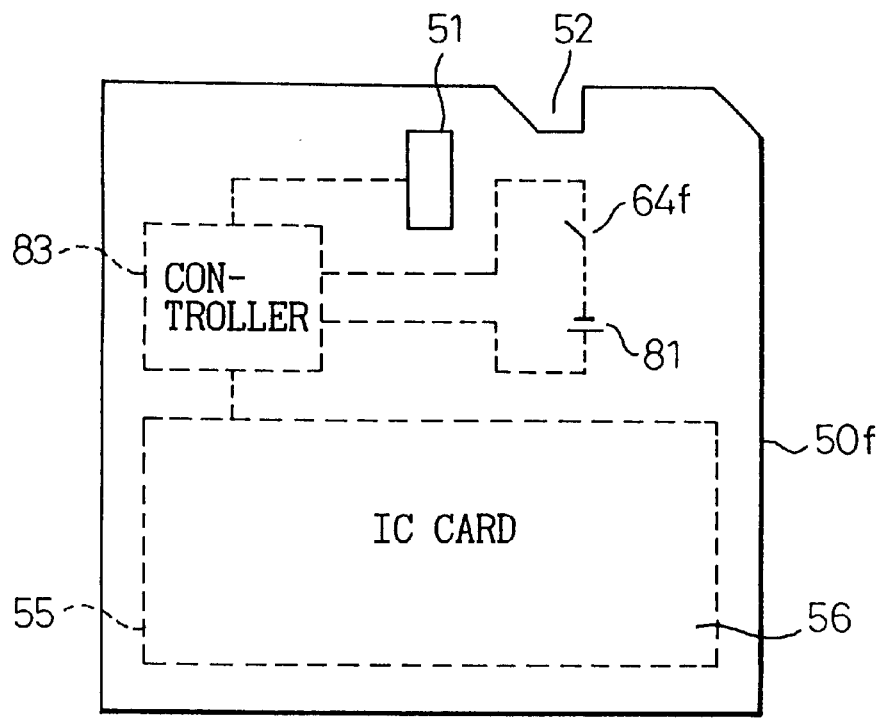
FIG. 26 shows an electrical configuration of the adapter of the sixth embodiment.

FIG. 26 shows an electrical configuration of the adapter 50*f*. When the adapter 50*f* is outside the FDD 70, the switch 64*f* is OFF to supply no power from a battery 81 to a controller 83.

When the adapter 50*f* is inserted into the FDD 70, the switch 64*f* is pressed with the tip of the spindle 707, to supply power from the battery 81 to the controller 83.

Figure 27A:
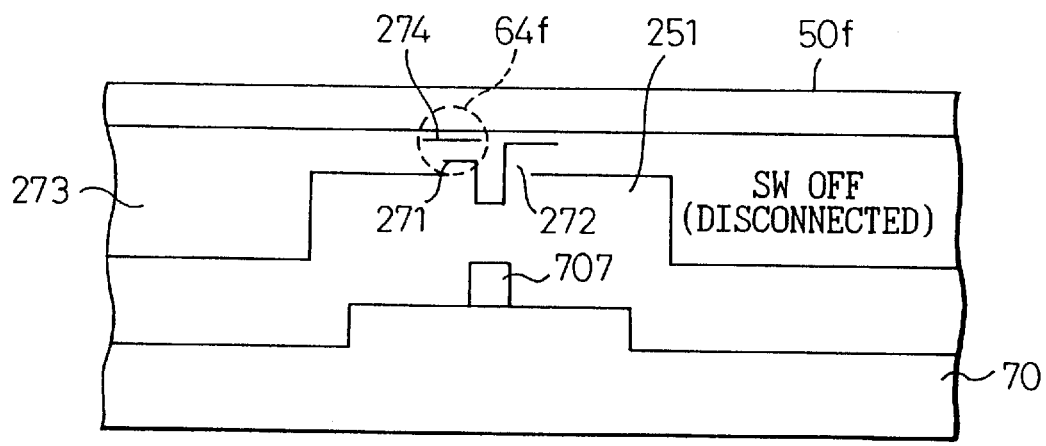
FIGS. 27(a) and 27(b) are partial sectional views taken along a line X—X of FIG. 25, showing the adapter of the sixth embodiment before and after insertion into the FDD.
Figure 27B:
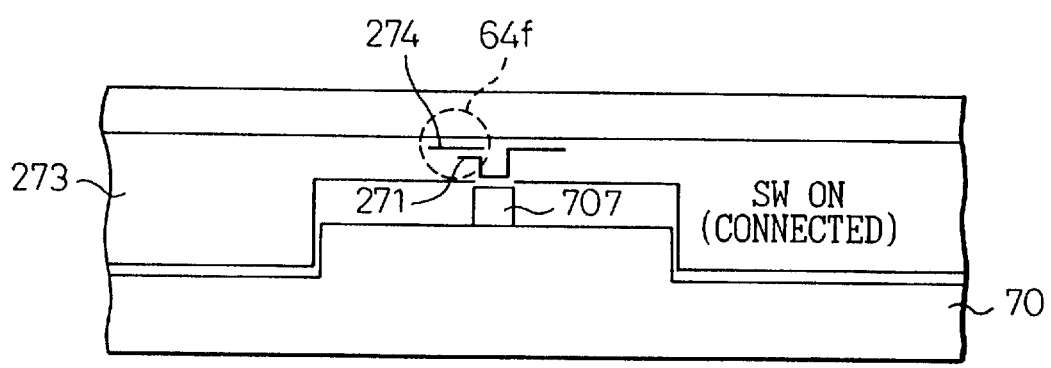

FIGS. 27(*a*) and 27(*b*) are partial sectional views taken along a line X—X of FIG. 25, showing the adapter 50*f* before and after complete insertion into the FDD 70. The recess 251 has a hole 272 in which a contact 271 of the switch 64*f* is movable. The other contact 274 of the switch 64*f* is attached to a base 273 of the adapter 50*f*.

When the adapter 50*f* is outside the FDD 70, the contacts 271 and 274 are separated from each other. When the adapter 50*f* is completely inserted into the FDD 70, the tip of the spindle 707 pushes the contact 271 against the contact 274, to supply power from the battery 81 to the controller 83.

When the adapter 50*f* is ejected from the FDD 70, the spring separates the contacts 271 and 274 from each other to supply no power to the controller 83.

Seventh Embodiment

Figure 28:
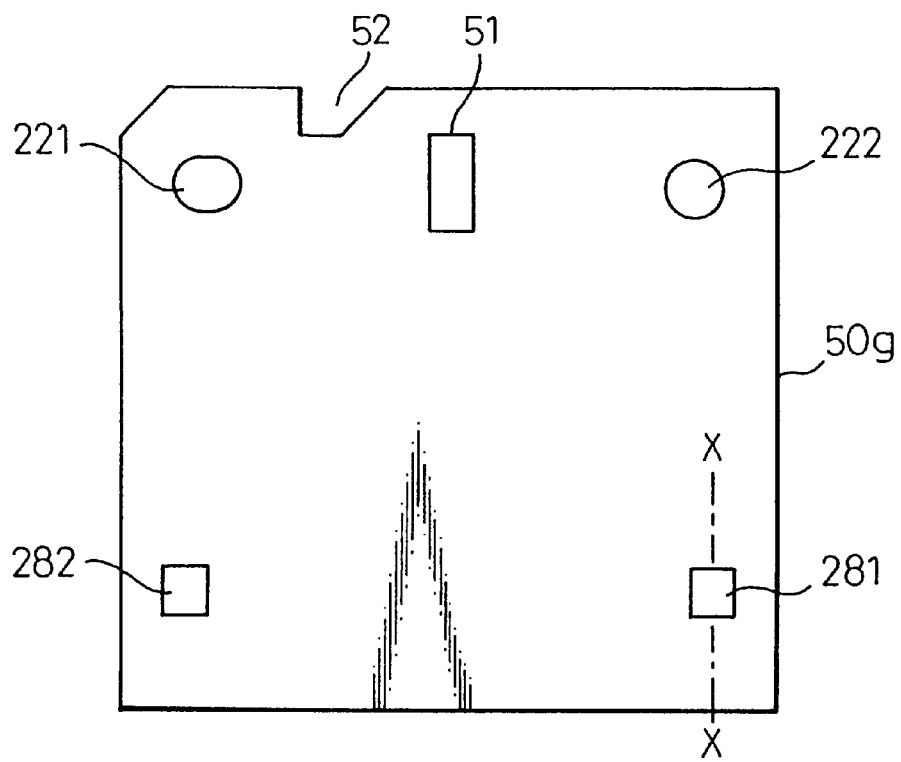
FIG. 28 shows a disk-cartridge-type adapter according to a seventh embodiment of the present invention.

FIG. 28 shows a disk-cartridge-type adapter 50*g* according to the seventh embodiment of the present invention. The adapter 50 g has an insertion detecting switch 64*g* (FIG. 30) at a position 281. The position 281 corresponds to the write-protect detecting mechanism 712 (FIG. 8) of the FDD 70 for determining whether or not an inserted FPD is write-protected. When the adapter 50*g* is completely inserted into the FDD 70, the switch 64*g* is pressed with the tip of the mechanism 712. The switch 64*g* is supported with a resilient member such as a spring so that it returns to the original position if no force is applied thereto. The resilient force of the switch 64*g* is so set that it can be pressed with the mechanism 712.

Figure 29:
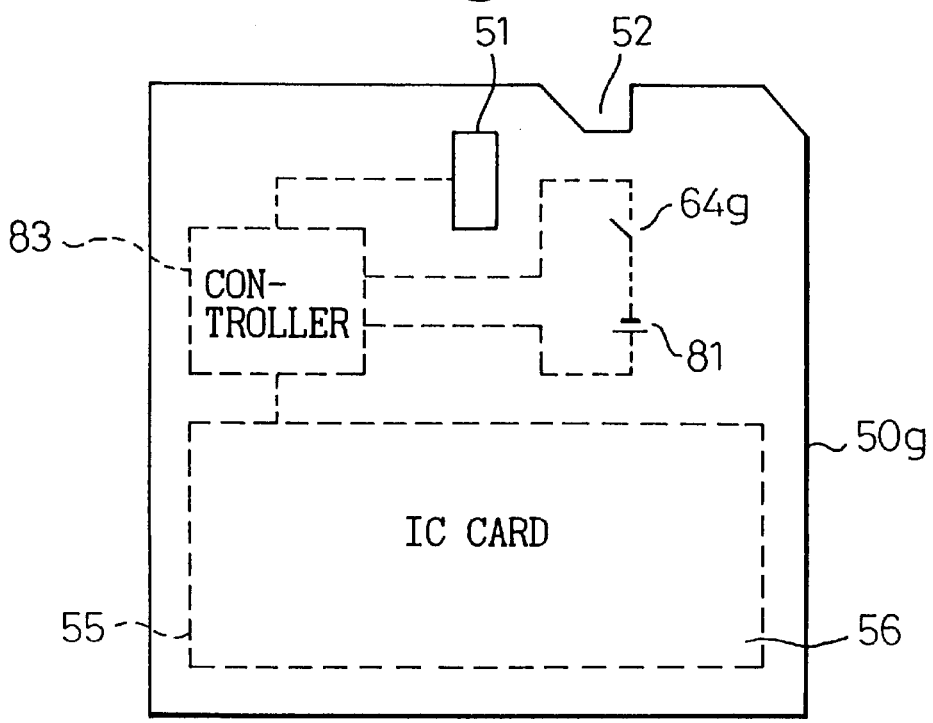
FIG. 29 shows an electrical configuration of the adapter of the seventh embodiment.

FIG. 29 shows an electrical configuration of the adapter 50*g*. When the adapter 50*g* is outside the FDD 70, the switch 64*g* is OFF to supply no power from a battery 81 to a controller 83.

When the adapter 50*g* is inserted into the FDD 70, the switch 64*g* is pressed with the tip of the mechanism 712, to supply power from the battery 81 to the controller 83.

Figure 30A:
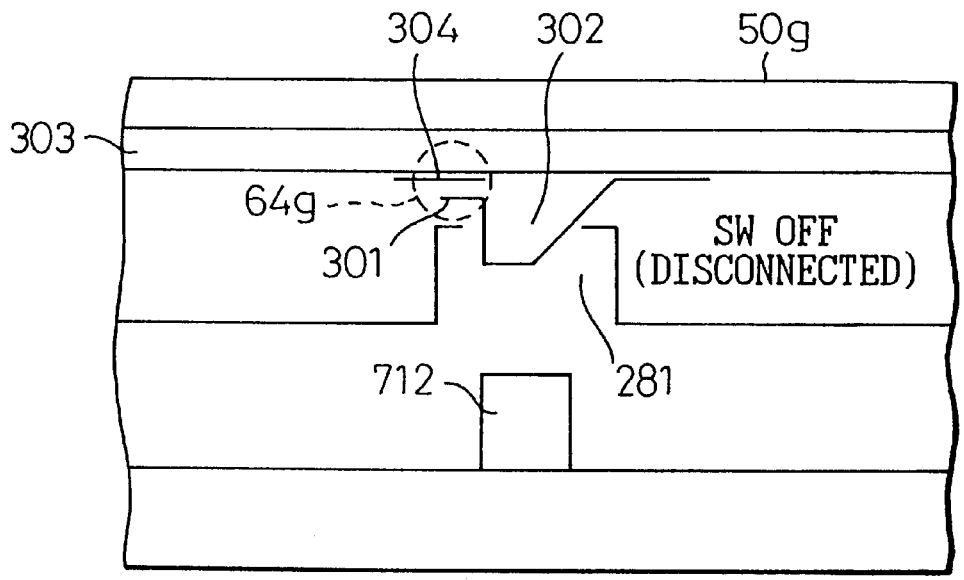
FIGS. 30(a) and 30(b) are partial sectional views taken along a line X—X of FIG. 28, showing the adapter of the seventh embodiment before and after insertion into the FDD.
Figure 30B:
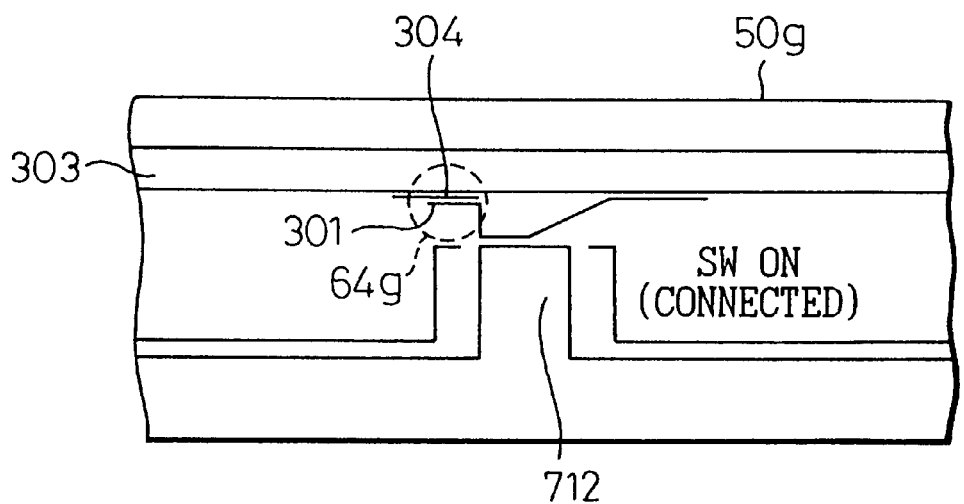

FIGS. 30(*a*) and 30(*b*) are partial sectional views taken along a line X—X of FIG. 28, showing the adapter 50*g* before and after complete insertion into the FDD 70. The adapter 50*g* has a hole 302 at the position 281. In the hole 302, a contact 301 of the switch 64*g* is movable. The other contact 304 of the switch 64*g* is attached to a base 303 of the adapter 50*g*.

When the adapter 50*g* is outside the FDD 70, the contacts 301 and 304 are separated from each other. When the adapter 50*g* is inserted into the FDD 70, the tip of the mechanism 712 of the FDD 70 pushes the contact 301 against the contact 304 to supply power from the battery 81 to the controller 83.

When the adapter 50*g* is ejected from the FDD 70, the spring separates the contacts 301 and 304 from each other to supply no power to the controller 83.

Eighth Embodiment

Figure 31:
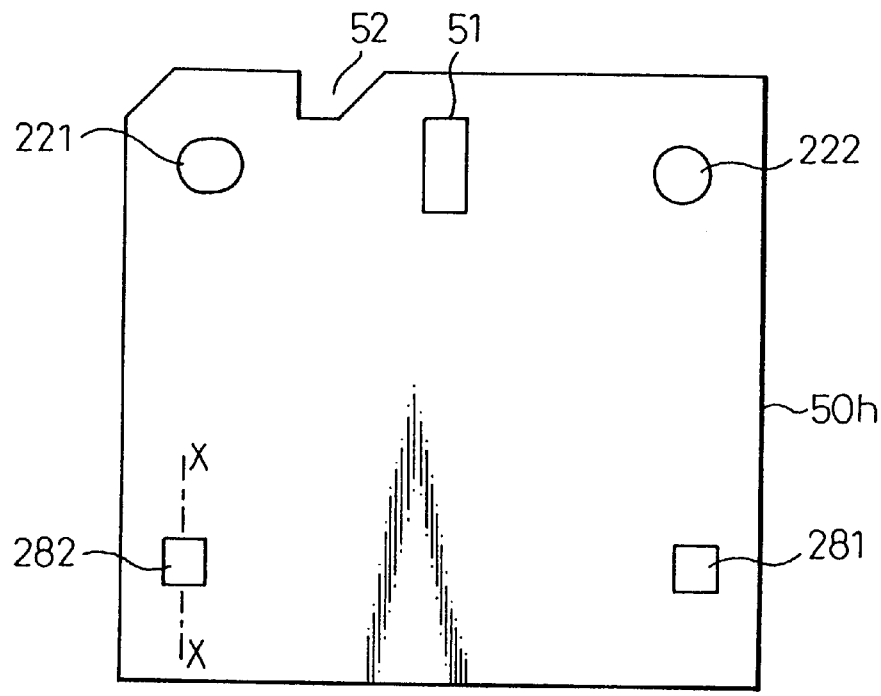
FIG. 31 shows a disk-cartridge-type adapter according to an eighth embodiment of the present invention.

FIG. 31 shows a disk-cartridge-type adapter 50*h* according to the eighth embodiment of the present invention. The adapter 50*h* has an insertion detecting switch 64*h* (FIG. 33) arranged at a position 282. The position 282 corresponds to the double-density detecting mechanism 711 (FIG. 8) of the FDD 70 for determining whether an FPD inserted into the FDD 70 is 2HD or 2DD. When the adapter 50*h* is inserted into the FDD 70, the switch 64*h* is pressed with the tip of the mechanism 711. The switch 64*h* is supported with a resilient member such as a spring so that it returns to the original position when no force is applied thereto. The resiliency of the switch 64*h* is so set that it can be pressed with the mechanism 711.

Figure 32:
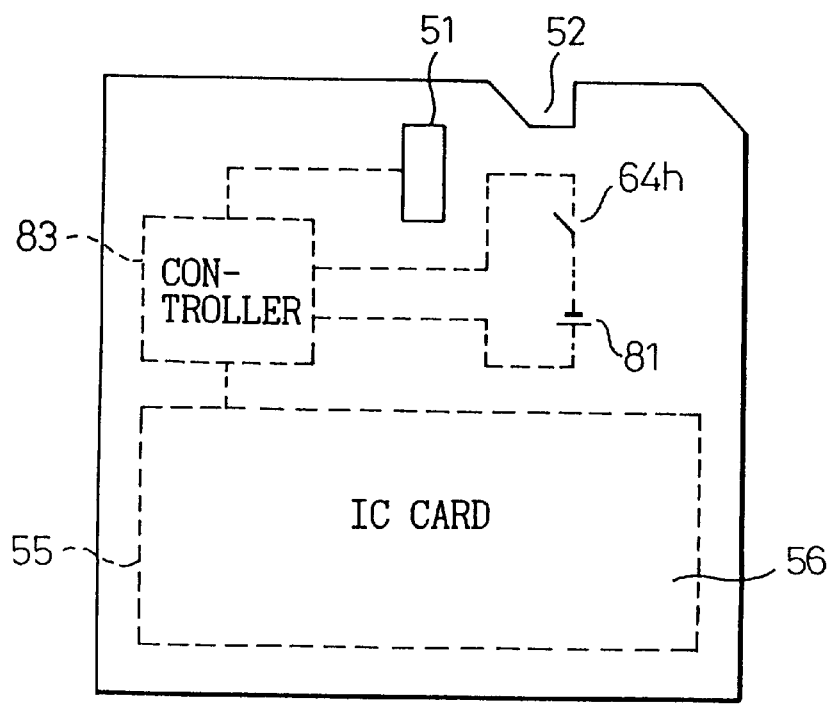
FIG. 32 shows an electrical configuration of the adapter of the eighth embodiment.

FIG. 32 shows an electrical configuration of the adapter 50*h*. When the adapter 50*h* is outside the FDD 70, the switch 64*h* is OFF to supply no power from a battery 81 to a controller 83.

When the adapter 50h is inserted into the FDD 70, the switch 64h is pressed with the tip of the mechanism 711, to supply power from the battery 81 to the controller 83.

Figure 33A:
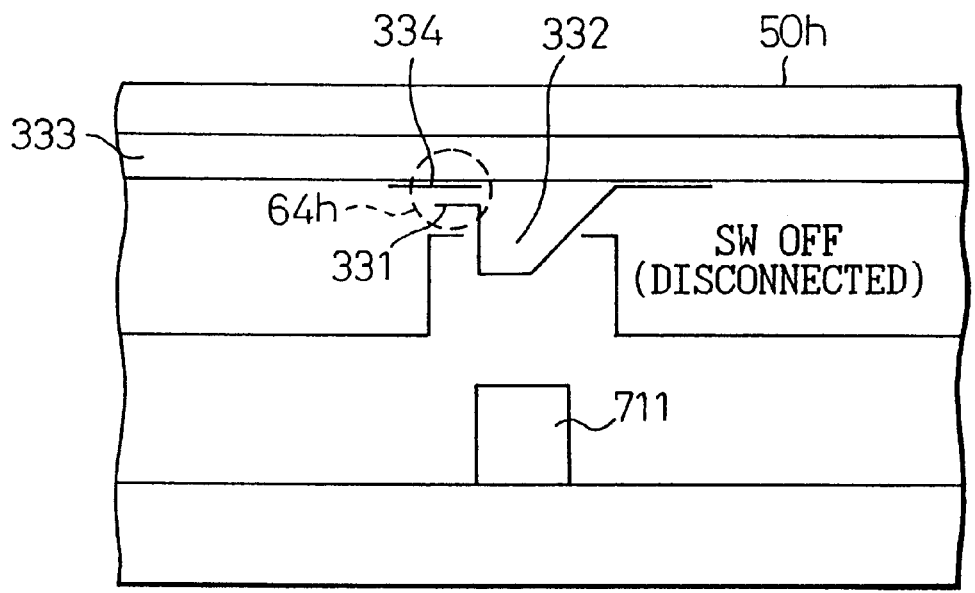
FIGS. 33(a) and 33(b) are partial sectional views taken along a line X—X of FIG. 31, showing the adapter of the eighth embodiment before and after insertion into the FDD.
Figure 33B:
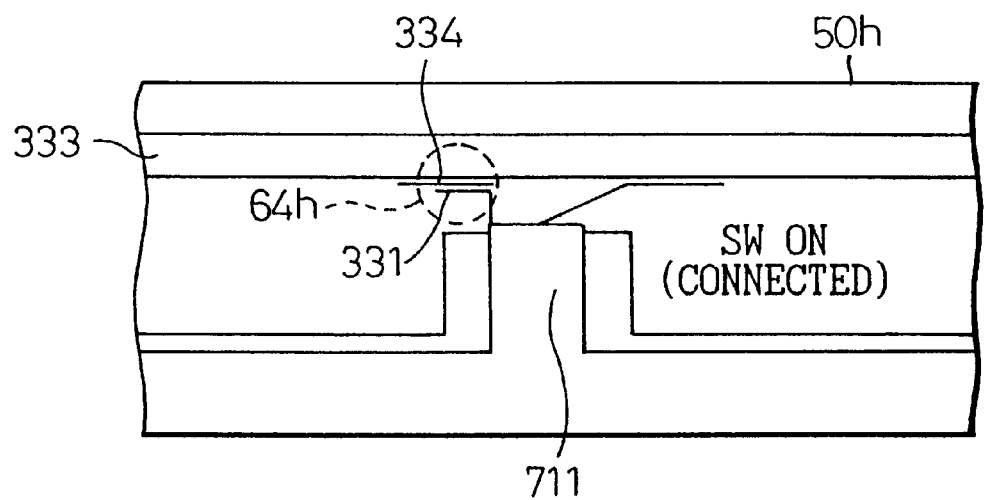

FIGS. 33(a) and 33(b) are partial sectional views taken along a line X—X of FIG. 31, showing the adapter 50h before and after complete insertion into the FDD 70. The adapter 50h has a hole 332 at the position 282. A contact 331 of the switch 64h is movable in the hole 332. The other contact 334 of the switch 64h is attached to a base 333 of the adapter 50h.

When the adapter 50h is outside the FDD 70, the contacts 331 and 334 are separated from each other. When the adapter 50h is inserted into the FDD 70, the tip of the mechanism 711 pushes the contact 331 against the contact 334 to supply power from the battery 81 to the controller 83.

When the adapter 50h is ejected from the FDD 70, the spring separates the contacts 331 and 334 from each other to supply no power to the controller 83.

The disk-cartridge-type adapter of any one of the first to eighth embodiments has no manual switch that must be turned on and off by a user. When the adapter is inserted into an FDD, power is automatically supplied to the controller of the adapter, and when the adapter is ejected from the FDD, power to the controller is automatically cut. The adapters of these embodiments, therefore, have improved operability and reduce power consumption.

Figure 34:
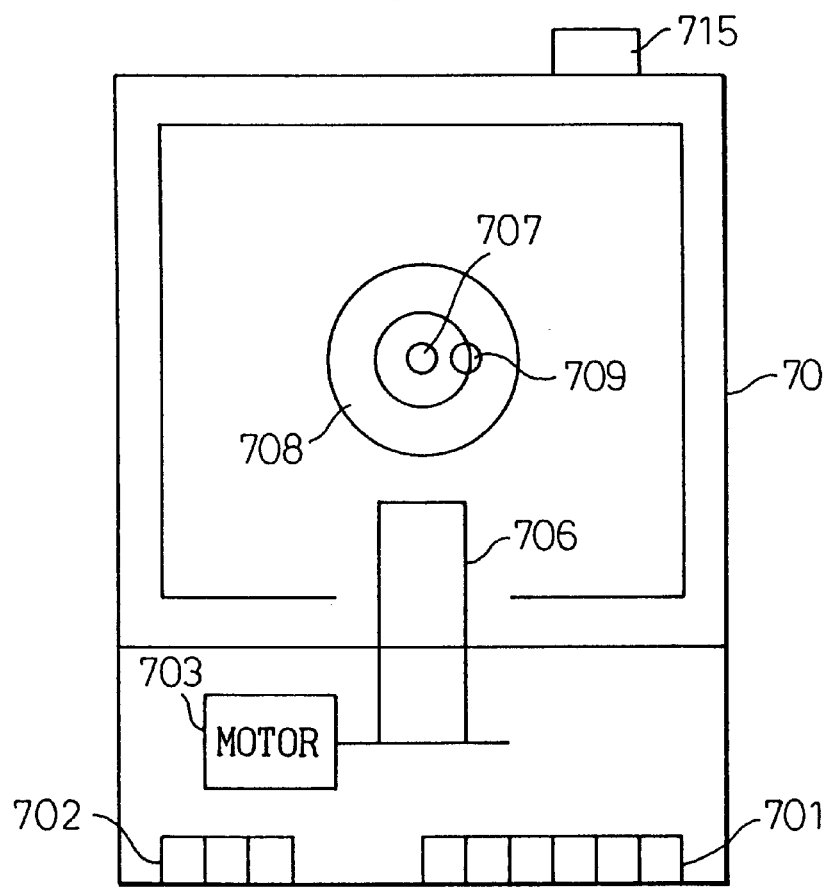
FIG. 34 shows the inside of a 3.5-inch FDD used to explain the following embodiments.

Embodiments that detect the rotation of an FDD motor to control power supply will be explained. First, a relationship between an FDD and an FPD will be explained with reference to FIGS. 34 to 36. FIG. 34 shows the inside of a 3.5-inch FDD, which is substantially the same as that of FIG. 8(a), and therefore, is not explained again.

Figure 35:
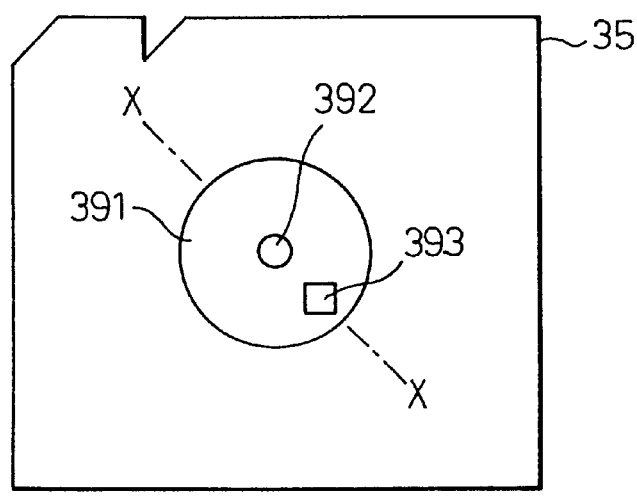
FIG. 35 is a plan view showing the back face of a 3.5-inch FPD.

FIG. 35 is a plan view showing the back face of a 3.5-inch FPD. The FPD 35 has a metal hub 391 attracted by a magnet 708 of the FDD 70 when the FPD 35 is inserted into the FDD 70. A spindle hole 392 receives the tip of a spindle 707 of the FDD 70. A drive pin hole 393 receives a drive pin 709 of the FDD 70.

Figure 36:
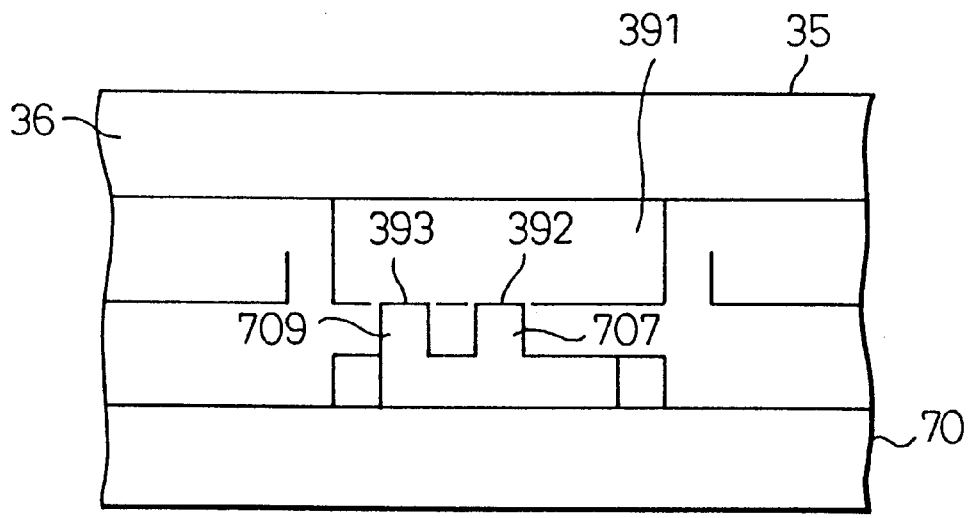
FIG. 36 is a sectional view taken along a line X—X of FIG. 35, showing the FPD set in the FDD.

FIG. 36 is a sectional view taken along a line X—X of FIG. 35, showing the FPD 35 in the FDD 70. The tip of the spindle 707 engages with the spindle hole 392, and the drive pin 393 engages with the drive pin hole 393. A motor 703 of the FDD 70 surely rotates a magnetic disk contained in the FPD 35 through the magnetic attraction and mechanical engagements.

Ninth Embodiment

FIGS. 37 to 40 show a disk-cartridge-type adapter 50i according to the ninth embodiment of the present invention.

The adapter 50i has a recess 251 that may receive the metal hub 391 in the case of the FPD of FIG. 35. The recess 251 of the adapter 50i accommodates a rotation detecting switch 65i.

Figure 37:
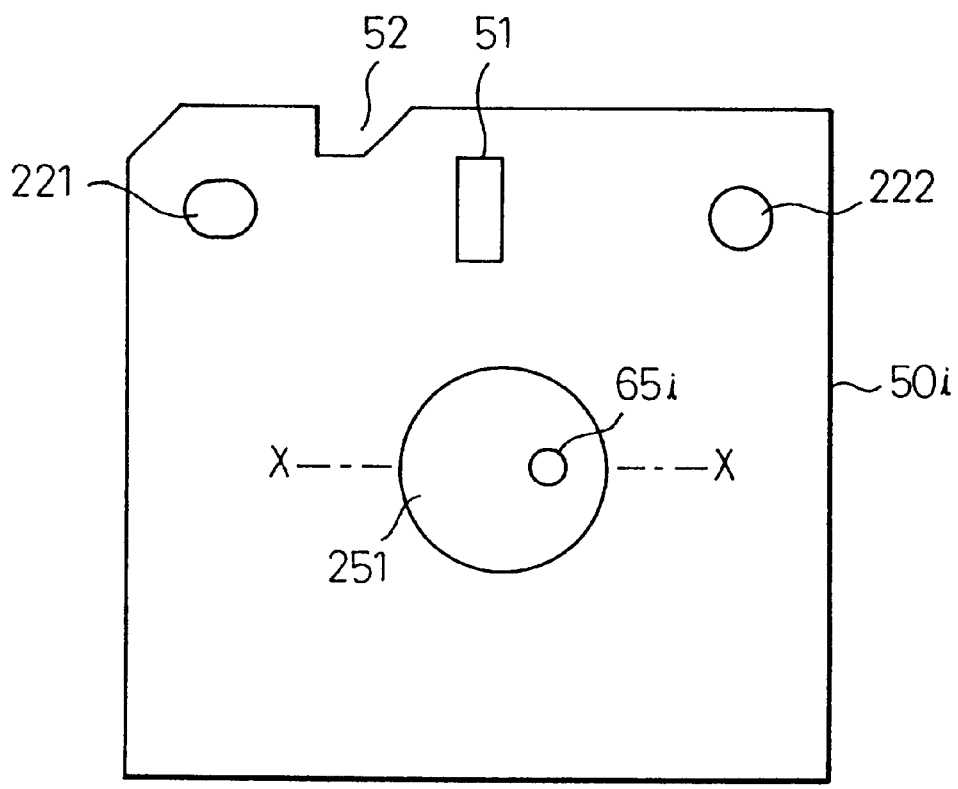
FIG. 37 shows a disk-cartridge-type adapter according to a ninth embodiment of the present invention.
Figure 38A:
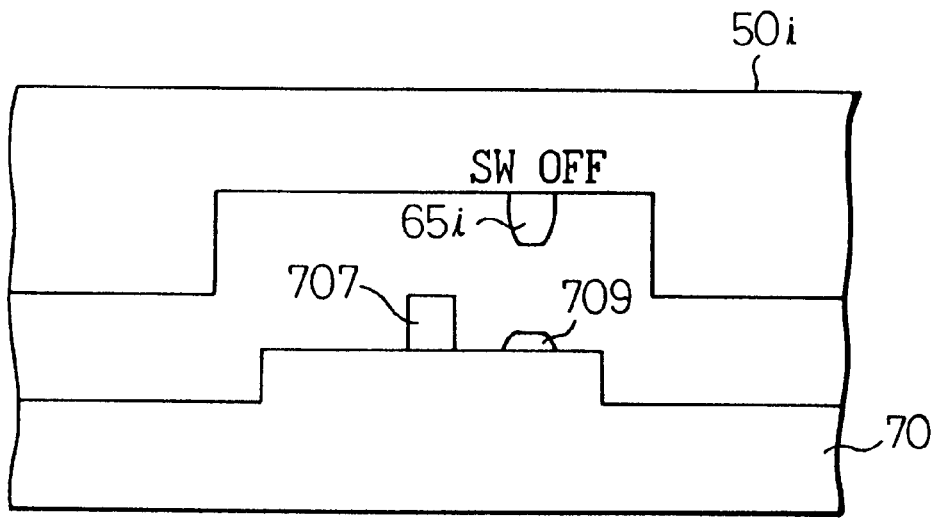
FIGS. 38(a) and 38(b) are partial sectional views taken along a line X—X of FIG. 37, showing the adapter of the ninth embodiment before and after complete setting in the FDD.
Figure 38B:
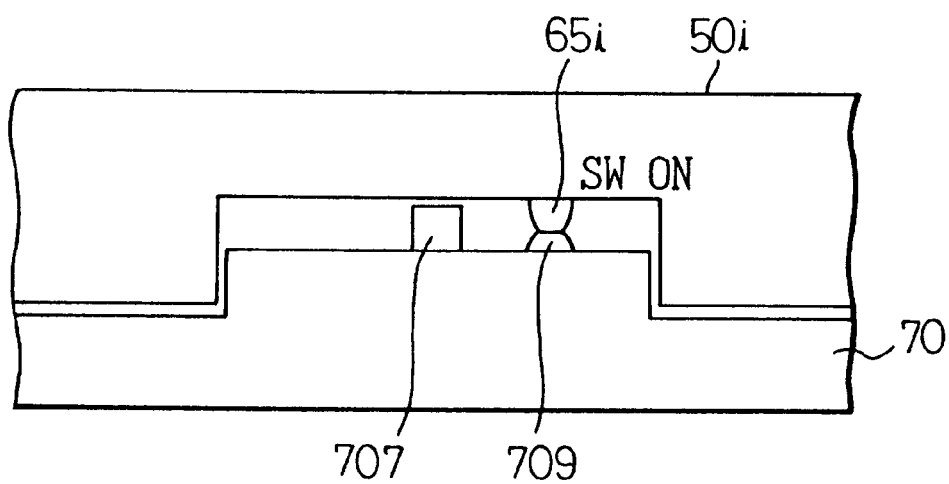

FIGS. 38(a) and 38(b) are partial sectional views taken along a line X—X of FIG. 37, showing the adapter 50i before and after complete setting in the FDD 70. The switch 65i is at a position where the drive pin 709 of the FDD 70 passes. The tips of the drive pin 709 and switch 65i are rounded so that the switch 65i may smoothly turn on and off in response to the rotation of the motor 703 of the FDD 70.

Figure 39:
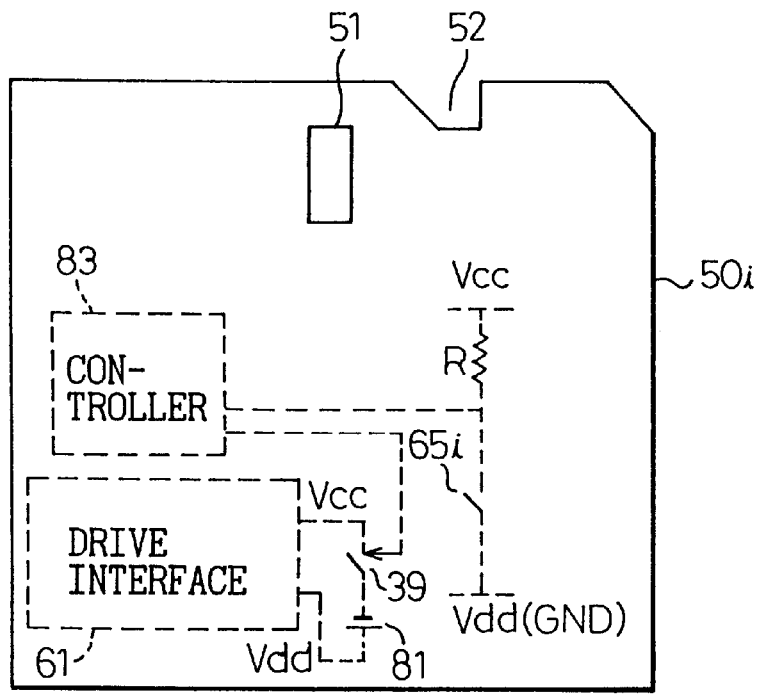
FIG. 39 shows an electrical configuration of the adapter of the ninth embodiment.
Figure 40:
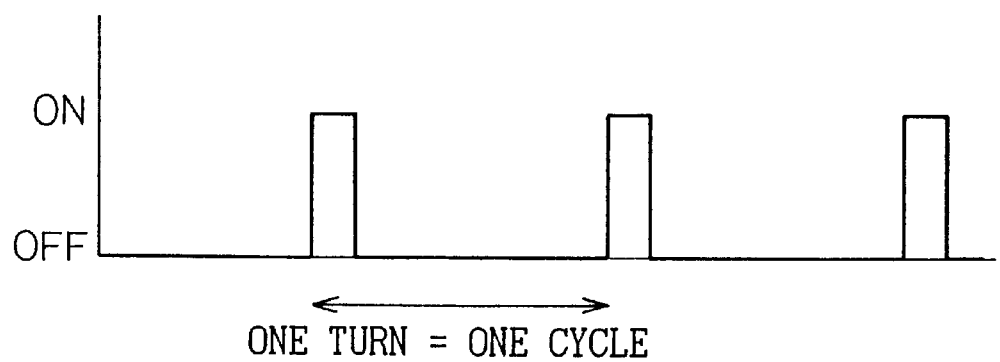
FIG. 40 shows an output waveform of a rotation detecting switch of the adapter of the ninth embodiment.

FIG. 39 shows an electrical configuration of the adapter 50i. After the adapter 50i is completely set in the FDD 70, the motor 703 (FIG. 34) starts. The drive pin 709 turns with the spindle 707. At this time, power is being supplied to a controller 83 of the adapter 50i. When the spindle 707 makes one turn, the drive pin 709 pushes the switch 65i once. The controller 83 detects that the switch 65i is turning on and off at regular intervals as shown in FIG. 40 and determines that the FDD 70 is accessing the adapter 50i. Then, the controller 83 turns on a switch 39 to supply power from a battery 81 to a drive interface 61 (Refer to FIG. 6, too). If the switch 65i does not show on/off operations at regular intervals, the controller 83 determines that the FDD 70 is not accessing the adapter 50i and turns off the switch 39, to cut power supply to the drive interface 61.

Tenth Embodiment

FIGS. 41 to 44 show a disk-cartridge-type adapter 50j according to the tenth embodiment of the present invention.

The adapter 50j has a metal hub 391a corresponding to that of an FPD, a spindle hole 392a, and a drive pin hole 393a. The metal hub 391a has a hole 41. A light emitting element 65je and a light receiving element 65jr are arranged above and below the metal hub 391a.

Figure 41:
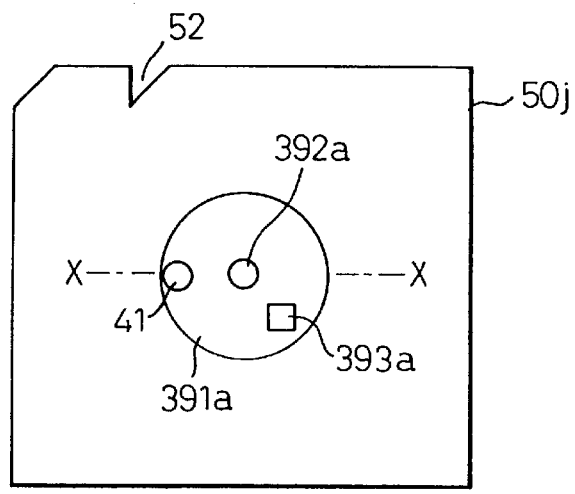
FIG. 41 shows a disk-cartridge-type adapter according to a tenth embodiment of the present invention.
Figure 42:
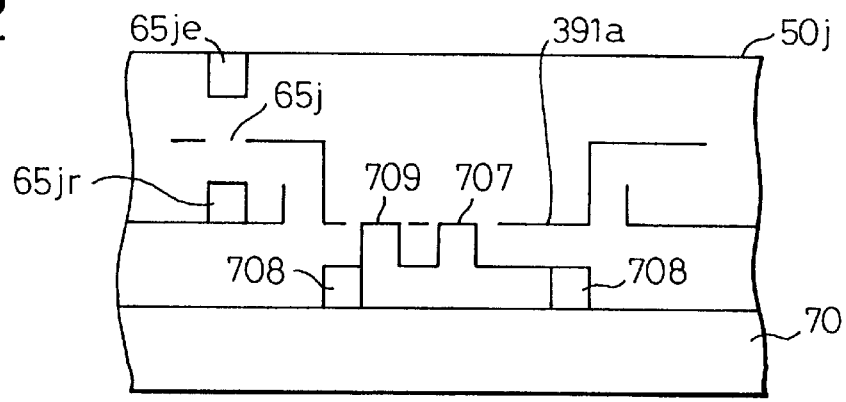
FIG. 42 is a partial sectional view taken along a line X—X of FIG. 41, showing the adapter of the tenth embodiment inserted in the FDD.

FIG. 42 is a sectional view taken along a line X—X of FIG. 41 with the adapter 50j is set in the FDD 70. The light emitting element 65je and light receiving element 65jr are arranged at the top and bottom of the inside of the adapter 50j, to detect the hole 41 on the metal hub 391a.

Figure 43A:
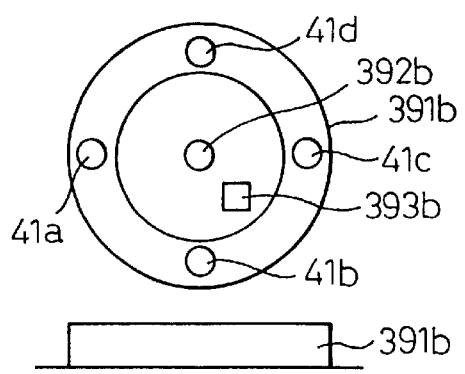

FIGS. 43(a) and 43(b) are plan and side views showing another metal hub 391b applicable to the adapter 50j. The metal hub 391b has four holes 41a to 41d, a spindle hole 392b, and a drive pin hole 393b.

The light emitting element 65je always emits light, and the light receiving element 65jr receives the light only when the light passes through the holes 41a to 41d and converts the received light into an electric signal.

Figure 44:
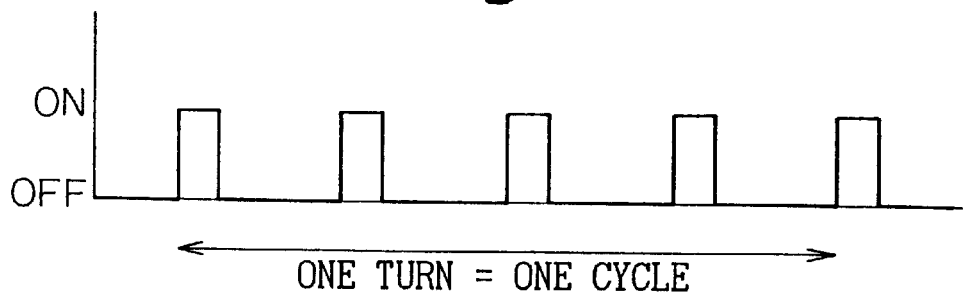
FIG. 44 shows an output waveform of an optical sensor used with the metal hub of the tenth embodiment.

FIG. 44 shows an output waveform of the light receiving element 65jr when the metal hub 391b is used. Since the metal hub 391b has four holes, the element 65jr provides four pulses for each rotation of the motor 703 of the FDD 70.

A controller 83 receives and processes the output of the light receiving element 65jr in the same manner as the embodiment of FIG. 39. Accordingly, the operation of the controller 83 will be explained with reference to FIG. 39.

When the controller 83 counts a predetermined number of pulses in the output of the light receiving element 65jr in a predetermined period, the controller 83 determines that the motor 703 is rotating. In the case of the metal hub 391b of FIG. 43(a), there are four pulses per a turn of the motor 703. Then, the controller 83 determines that the FDD 70 is accessing the adapter 50j and turns on the switch 39 to supply power from the battery 81 to the drive interface 61 (Refer to FIG. 6, too). If the predetermined number of pulses are not detected in the output of the light receiving element 65jr in the predetermined period, the controller 83 determines that the FDD 70 is not accessing the adapter 50j and turns off the switch 39 to cut power supply to the drive interface 61. Although the metal hub 391b has four holes, any number of holes may be formed on the metal hub.

Eleventh Embodiment

Figure 45A:
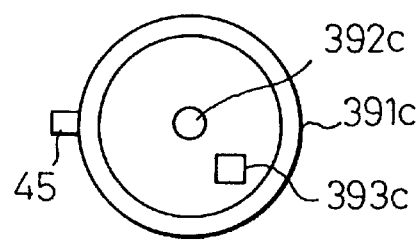
FIGS. 45(a) and 45(b) are plan and side views showing a metal hub having a projection of a disk-cartridge-type adapter according to an eleventh embodiment of the present invention.
Figure 45B:

FIGS. 45(a) and 45(b) are plan and side views showing a metal hub 391c provided for a disk-cartridge-type adapter according to the eleventh embodiment of the present invention. The metal hub 391c corresponds to a metal hub of an FPD. The metal hub 391c has a projection 45 at the periphery thereof, a spindle hole 392c, and a drive pin hole 393c. A light emitting element and a light receiving element are arranged at above and below a position where the projection 45 passes.

Figure 46:
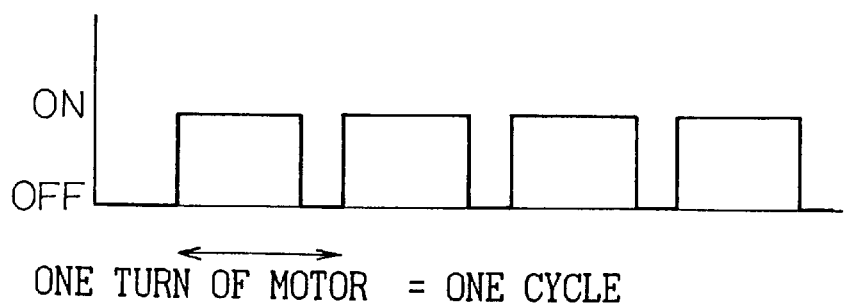
FIG. 46 shows an output waveform of an optical sensor used with the metal hub of the eleventh embodiment.

FIG. 46 shows an output waveform of the light receiving element. When the projection 45 blocks light, the output waveform drops to an OFF level, and in the other case, maintains an ON level. When the motor 703 of the FDD 70 is rotating, the output waveform shows a pulse per turn of the motor 703, and therefore, it is possible to determine whether or not the FDD 70 is accessing the adapter.

Twelfth Embodiment

FIGS. 47 to 50 show a disk-cartridge-type adapter 50k according to the twelfth embodiment of the present invention.

Figures 47A, 47C:
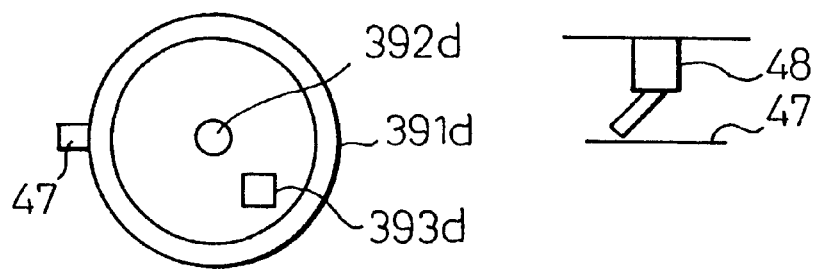
FIGS. 47(a) and 47(b) are plan and side views showing a metal hub having a projection of a disk-cartridge-type adapter according to a twelfth embodiment of the present invention.
FIG. 47(c) shows a mechanical switch working with the projection of-the twelfth embodiment.
Figure 47B:
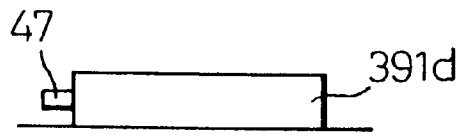
Figure 48:
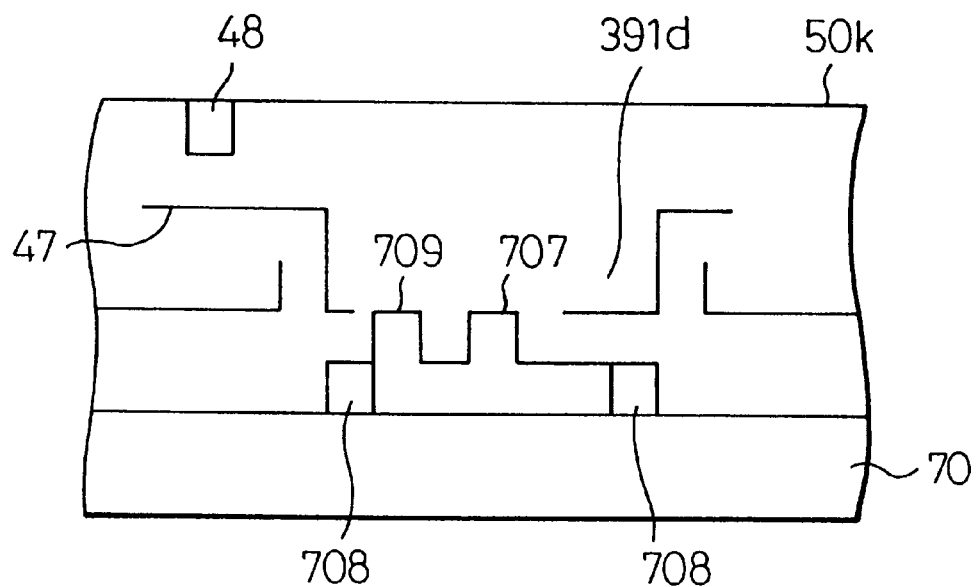
FIG. 48 is a sectional view showing the projection and mechanical switch in an ON state of the twelfth embodiment.
Figure 49:
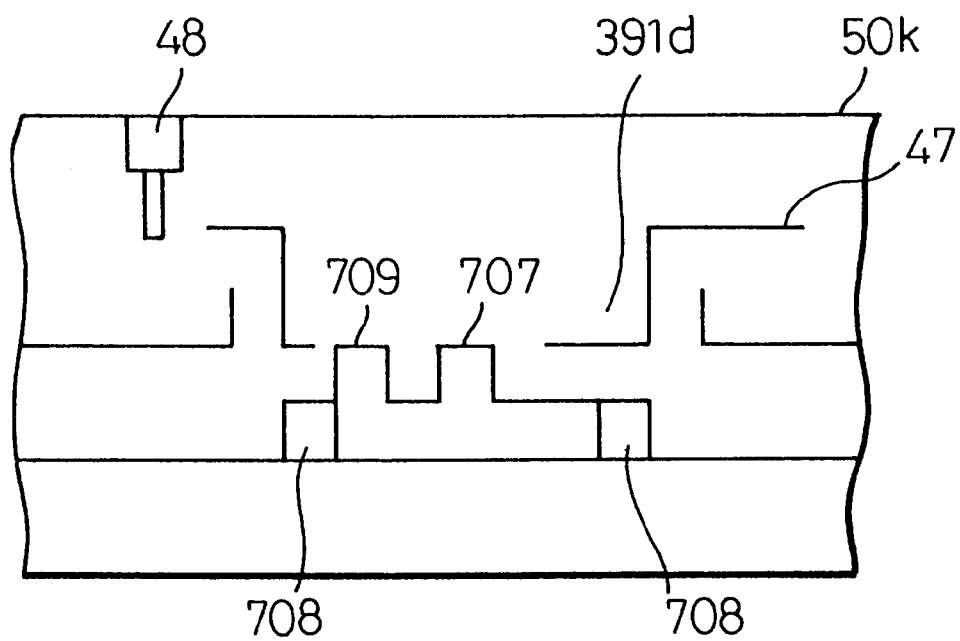
FIG. 49 is a sectional view showing the projection and mechanical switch in an OFF state of the twelfth embodiment.
Figure 50:
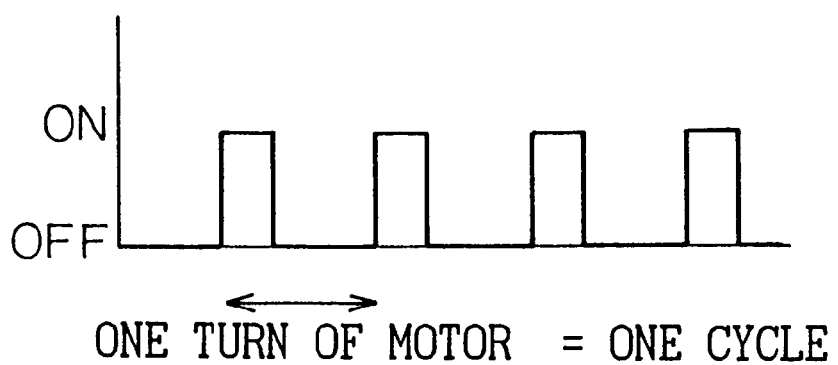
FIG. 50 shows an output waveform of the mechanical switch of the twelfth embodiment.

FIGS. 47(a) and 47(b) are plan and side views showing a metal hub 391d provided for the adapter 50k. The metal hub 391d has a projection 47 and is arranged on the back face of the adapter 50k. FIG. 47(c) shows a mechanical switch 48 that is turned on when the projection 47 contacts therewith. The metal hub 391d corresponds to a metal hub of an FPD and has a spindle hole 392d and a drive pin hole 393d. The projection 47 is formed at the periphery of the metal hub 391d to turn on and off the mechanical switch 48 arranged above the metal hub 391d. The other arrangements of the twelfth embodiment are the same as those of the eleventh embodiment. The mechanical switch 48 turns on only when the projection 47 touches the same. FIG. 48 is a sectional view showing the mechanical switch 48 that is ON due to the projection 47. FIG. 49 is a sectional view showing the mechanical switch 48 that is OFF because the projection 47 is not in contact with the same. FIG. 50 shows the output of the mechanical switch 48. The output shows a pulse for each rotation of the motor 703 of the FDD 70.

A controller of the adapter 50k is the same as that of FIG. 39. The controller detects the output of the mechanical switch 48. If the output contains a predetermined number of pulses in a predetermined period (one pulse per turn of the motor 703 in the case of the metal hub 391d), the controller determines that the motor 703 is rotating. Namely, the controller determines that the FDD 70 is accessing the adapter 50k and turns on the switch 39 to supply power from the battery 81 to the drive interface 61. If the predetermined number of pulses is not counted in the predetermined period, the controller determines that the FDD 70 is not accessing the adapter 50k and turns off the switch 39 to stop power supply to the drive interface 61. Although the metal hub 391d has only one projection, the metal hub may have an optional number of projections.

Thirteenth Embodiment

The first to eighth embodiments of FIGS. 9 to 33 detect the completion of insertion of the adapter into an FDD. This is primary detection. The ninth to twelfth embodiments of FIGS. 37 to 50 detect an access state (a motor rotation state). This is secondary detection. The primary detection is used to supply power to the controller 83 (the MPU 621 of FIG. 12) contained in the adapter, and then, the secondary detection is carried out.

The MPU that is activated upon the primary detection monitors a result of the secondary detection. The MPU may always monitor the secondary detection result or may receive an interrupt signal provided by hardware that monitors the secondary detection result. In response to the secondary detection result, the MPU supplies power to each internal element of the adapter to start various processes.

This two-stage power supply automatically starts a low-power-consumption mode according to the primary detection when the adapter is set in an FDD and a full-operation mode according to the secondary detection when the FDD accesses the adapter. As a result, the adapter has improved operability and reduced power consumption.

A way of supplying power to each part of the adapter according to the primary and secondary detection will be explained in detail with reference to FIGS. 51 and 52.

FIG. 51 shows functional blocks of a disk-cartridge-type adapter according to the thirteenth embodiment of the present invention. This figure corresponds to FIG. 6. The adapter has a drive interface 61 for communicating with the FDD 70, an MPU block 62, and a card interface 63. The drive interface 61 includes an MFM modulator-demodulator 512 and a magnetic coupling unit 511 that communicates with the FDD 70. The FDD 70 communicates with a data processor 540 such as a personal computer. The MPU block 62 includes an MPU 621 incorporating a ROM and a RAM, an insertion detecting switch 64, and a rotation detecting switch 65. The card interface 63 includes a card contact 631 for communicating with the MPU 621 and an IC card. The insertion detecting switch 64 is of any one of the first to eighth embodiments, and the rotation detecting switch 65 is of any one of the ninth to twelfth embodiments.

Based on the state of the adapter, the adapter controls power supply from a power source.

The operation of the adapter is dependent on commands from the FDD 70 and is classified into first to third operations. The first operation includes a self-diagnosis achieved when the adapter is set in the FDD 70, to check memories, battery capacity, circuit correctness, etc., and waits for activation. The second operation detects an access from the FDD 70 and communicates with the FDD 70. The third operation communicates with the IC card. The adapter controls the power source according to these operations and supplies power only to necessary blocks as shown in FIG. 52, to reduce power consumption.

If the adapter detects a stoppage of the FDD motor while operating as shown in FIG. 53, the adapter stops power supply to the drive interface 61. If the FDD motor restarts, the adapter resumes power supply to the drive interface 61. Even if the FDD motor stops due to an abnormality in the FDD 70, the adapter stops power supply to the drive interface 61 to prevent useless power consumption.

If the FDD motor continuously rotates even after the completion of operation as shown in FIG. 54, the adapter forcibly cuts power supply to each part thereof after a predetermined period.

When the FDD 70 accesses the adapter, the MPU 621 detects it by detecting the rotation of the FDD motor. When the access completes, the FDD motor is stopped, and therefore, the MPU 621 knows that the access has ended. If an abnormality occurs in the FDD 70 or FDD motor, the FDD motor may continuously rotate even after the completion of an access, to uselessly consume the power of the adapter.

To cope with this problem, the MPU 621 sends a completion notice of operation and starts a timer. If the timer counts a predetermined time for usually stopping the FDD motor, the adapter stops power supply to each block thereof.

Fourteenth Embodiment

Figure 55:
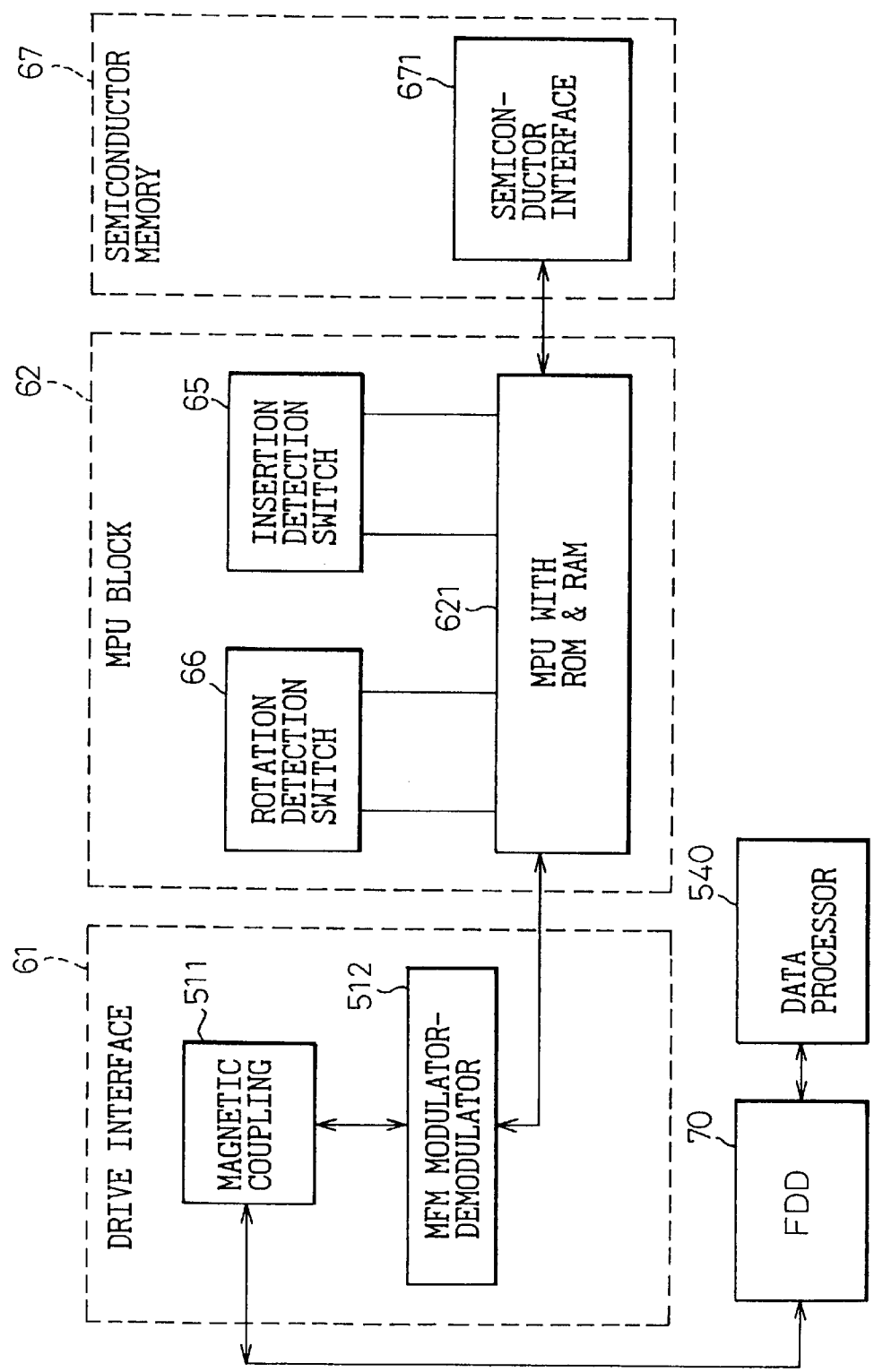
FIG. 55 shows an electrical configuration of a disk-cartridge-type adapter according to a fourteenth embodiment of the present invention.

FIG. 55 shows an electrical configuration of a disk-cartridge-type adapter according to the fourteenth embodiment of the present invention. The same parts as those of FIG. 51 are represented with like reference marks and are not explained again. The adapter incorporates a semiconductor memory 65 instead of the card interface 63 of FIG. 51. The memory 65 includes a semiconductor interface 651.

According to the output of an insertion detecting switch 64, power is supplied to an MPU 621. If the MPU 621 detects that an FDD motor is rotating according to the output of a rotation detecting switch 65, the MPU 621 supplies power to a drive interface 61 and the memory 65. Upon detecting a stoppage of the FDD motor, the MPU 621 stops power supply to the drive interface 61 and memory 65, similar to the embodiment of FIG. 51.

In the above explanation, the disk-cartridge-type adapters have the same shape as an FPD, and the disk cartridge drive is an FDD. The present invention is not limited to these examples. The adapters of the present invention may have the same shape as any one of various types of disk cartridges and may be used with a proper one of disk cartridge drives.

As explained above, the present invention provides a disk-cartridge-type adapter that supplies power from an internal power-source only to necessary parts upon detecting insertion of the adapter into a disk cartridge drive, to thereby reduce power consumption.

The adapter of the present invention supplies power from the internal power source only to necessary parts upon detecting an access from the drive to the adapter, to further reduce power consumption.

The adapter of the present invention individually controls power supply to functional blocks of the adapter according to the insertion detection and access detection, to further reduce power consumption.

What is claimed is:

1. An adapter having a power source, a controller, and functional blocks controlled by the controller, the adapter being shaped like a disk cartridge so that the adapter is insertable into a disk cartridge drive, comprising:

rotation detecting means for detecting the rotation of a motor of the disk cartridge drive, so that the controller may determine whether or not the disk cartridge drive is accessing the adapter and whether or not power from the-power source must be supplied to the functional blocks.

2. The adapter of claim 1, wherein:

the rotation detecting means is arranged at a position where a disk cartridge drive pin connected to a spindle of the motor of the disk cartridge drive passes so that the rotation detecting means is turned on and off in response to the passage of the disk cartridge drive pin; and it is determined that the motor is rotating if the rotation detecting means alternates between on and off states for a predetermined period.

3. The adapter of claim 1, wherein:

the rotation detecting means has a metal hub attracted by a magnet that rotates with the motor, at least one hole formed on the metal hub, and an optical sensor that turns on and off in response to light that passes through the hole; and it is determined that the motor is rotating if the rotation detecting means alternates between on and off states for a predetermined period.

4. The adapter of claim 1, wherein:

the rotation detecting means has a metal hub attracted by a magnet that rotates with the motor, at least one projection protruding from the metal hub, and an optical sensor that turns on and off in response to light that is intermittently blocked by the projection; and it is determined that the motor is rotating if the rotation detecting means alternates between on and off states for a predetermined period.

5. The adapter of claim 1, wherein:

the rotation detecting means has a metal hub attracted by a magnet that rotates with the motor, at least one projection protruding from the metal hub, and a mechanical switch that is turned on and off with the projection; and it is determined that the motor is rotating if the rotation detecting means alternates between on and off states for a predetermined period.

6. An adapter having a power source, a controller, and functional blocks controlled by the controller, the adapter being shaped like a disk cartridge so that the adapter is insertable into a disk cartridge drive, comprising:

insertion detecting means for detecting complete insertion of the adapter into the disk cartridge drive, so that power supply from the power source is enabled on detecting the complete insertion and is disabled on not detecting the complete insertion; and rotation detecting means for detecting the rotation of a motor of the disk cartridge drive, so that the controller may determine whether or not the disk cartridge drive is accessing the adapter and whether or not power from the power source must be supplied to the functional blocks.

7. The adapter of claim 6 wherein:

the functional blocks include at least a drive interface for communicating with a data processor through the disk cartridge drive; and the controller supplies power from the power source to the drive interface if it is determined that the motor is rotating and stops the same if it is determined that the motor is not rotating.

8. The adapter of claim 7, wherein the controller stops power supply to the drive interface if the motor is not rotating even if the adapter is processing data according to commands from the disk cartridge drive, and resumes power supply to the drive interface if the motor starts to rotate.

9. The adapter of claim 8, wherein the controller forcibly turns off the power source a predetermined period after the completion of the data processing even if the motor is rotating.

10. The adapter of claim 6, wherein:

the functional blocks include an IC card socket for receiving an IC card and a card interface for establishing communication between the IC card and the controller; and the controller supplies power from the power source to the card interface only when the controller accesses the IC card.

11. The adapter of claim 6, wherein:

the functional blocks include a semiconductor memory and a semiconductor interface for establishing communication between the semiconductor memory and the controller; and the controller supplies power from the power source to the semiconductor interface only when the controller accesses the semiconductor memory.

12. A disc cartridge type adapter comprising:

a power supply unit;

a processor adapted to be supplied with power from said power supply unit;

a hub having a rotational axis of a disc drive, said rotational axis being fixedly fitted to said hub so that said hub rotates in accordance with the rotation of said rotational axis;

a rotation detecting unit for detecting the rotation of said hub to output a signal each time said hub rotates by a predetermined number of rotations; and a control unit for controlling said power supply unit in such a way that a power supply is started from said power supply unit based on the result of the detection of the rotation of the hub by said rotation detecting unit.

13. A disc cartridge type adapter as claimed in claim 12, wherein said control unit detects the number of signals output from said rotation detecting unit, and controls said power supply unit when a predetermined number of said signals is output within a predetermined time.

14. A disc cartridge type adapter as claimed in claim 12, wherein said control unit detects the interval of the signals output from said rotation detecting unit, and controls said power supply unit when a predetermined interval of said signals is detected.

15. An adapter having a power source and shaped like a disk cartridge so that the adapter is insertable into a disk cartridge drive, comprising:

insertion detecting means for detecting complete insertion of the adapter into the disk cartridge drive, so that power supply from the power source is enabled on detecting the complete insertion and is disabled on not detecting the complete insertion, wherein:

the insertion detecting means is so arranged to be pressed with a disk cartridge driving spindle of the disk cartridge drive; and power supply from the power source is enabled when the insertion detecting means is pressed with the disk cartridge driving spindle and is disabled when the insertion detecting means is not pressed with the same.

16. An adapter having a power source and shaped like a disk cartridge so that the adapter is insertable into a disk cartridge drive, comprising:

insertion detecting means for detecting complete insertion of the adapter into the disk cartridge drive, so that power supply from the power source is enabled on detecting the complete insertion and is disabled on not detecting the complete insertion, wherein:

the insertion detecting means is so arranged to be pressed with a write-protect detecting mechanism of the disk cartridge drive; and power supply from the power source is enabled when the insertion detecting means is pressed with the write-protect detecting mechanism and is disabled when the insertion detecting means is not pressed with the same.

17. An adapter having a power source and shaped like a disk cartridge so that the adapter is insertable into a disk cartridge drive, comprising:

insertion detecting means for detecting complete insertion of the adapter into the disk cartridge drive, so that power supply from the power source is enabled on detecting the complete insertion and is disabled on not detecting the complete insertion, wherein:

the insertion detecting means is so arranged to be pressed with a double-density detecting mechanism of the disk cartridge drive; and power supply from the power source is enabled when the insertion detecting means is pressed with the double-density detecting mechanism and is disabled when the insertion detecting means is not pressed with the same.

18. The adapter of claim 15, wherein:

the insertion detecting means is arranged at a position where a shutter opening/closing knob of the disk cartridge drive travels when the adapter is inserted into and ejected from the disk cartridge drive; and power supply from the power source is enabled when the insertion detecting means is pressed with the shutter opening/closing knob and is disabled when the insertion detecting means is not pressed with the same.

19. The adapter of claim 18, wherein the insertion detecting means is arranged at a position where the shutter opening/closing knob rests when the adapter is set in the disk cartridge drive.

20. The adapter of claim 18, wherein the insertion detecting means is arranged at each of two positions where the shutter opening/closing knob passes.

21. The adapter of claim 15, wherein the insertion detecting means is arranged at an insertion front end of the adapter and is pressed with a stopper of the disk cartridge drive that stops the adapter at a proper position in the disk cartridge drive; and power supply from the power source is enabled when the insertion detecting means is pressed with the stopper and is disabled when the insertion detecting means is not pressed with the same.

22. The adapter of claim 15, wherein:

the insertion detecting means is arranged at an insertion rear end of the adapter and is pressed with a retainer of the disk cartridge drive that prevents an unwanted ejection of the adapter from the disk cartridge drive; and power supply from the power source is enabled when the insertion detecting means is pressed with the retainer and is disabled when the insertion detecting means is not pressed with the same.

23. The adapter of claim 15, further comprising a positioning hole to engage with a positioning boss of the disk cartridge drive, wherein:

the insertion detecting means is arranged in the positioning hole and is pressed with the positioning boss when the adapter is completely inserted into the disk cartridge drive; and power supply from the power source is enabled when the insertion detecting means is pressed with the positioning boss and is disabled when the insertion detecting means is not pressed with the same.

24. The adapter of claim 16, wherein:

the insertion detecting means is arranged at a position where a shutter opening/closing knob of the disk cartridge drive travels when the adapter is inserted into and ejected from the disk cartridge drive; and power supply from the power source is enabled when the insertion detecting means is pressed with the shutter opening/closing knob and is disabled when the insertion detecting means is not pressed with the same.

25. The adapter of claim 24, wherein the insertion detecting means is arranged at a position where the shutter opening/closing knob rests when the adapter is set in the disk cartridge drive.

26. The adapter of claim 24, wherein the insertion detecting means is arranged at each of two positions where the shutter opening/closing knob passes.

27. The adapter of claim 16, wherein the insertion detecting means is arranged at an insertion front end of the adapter and is pressed with a stopper of the disk cartridge drive that stops the adapter at a proper position in the disk cartridge drive; and power supply from the power source is enabled when the insertion detecting means is pressed with the stopper and is disabled when the insertion detecting means is not pressed with the same.

28. The adapter of claim 16, wherein:

the insertion detecting means is arranged at an insertion rear end of the adapter and is pressed with a retainer of the disk cartridge drive that prevents an unwanted ejection of the adapter from the disk cartridge drive; and power supply from the power source is enabled when the insertion detecting means is pressed with the retainer and is disabled when the insertion detecting means is not pressed with the same.

29. The adapter of claim 16, further comprising a positioning hole to engage with a positioning boss of the disk cartridge drive, wherein:

the insertion detecting means is arranged in the positioning hole and is pressed with the positioning boss when the adapter is completely inserted into the disk cartridge drive; and power supply from the power source is enabled when the insertion detecting means is pressed with the positioning boss and is disabled when the insertion detecting means is not pressed with the same.

30. The adapter of claim 17, wherein:

the insertion detecting means is arranged at a position where a shutter opening/closing knob of the disk cartridge drive travels when the adapter is inserted into and ejected from the disk cartridge drive; and power supply from the power source is enabled when the insertion detecting means is pressed with the shutter opening/closing knob and is disabled when the insertion detecting means is not pressed with the same.

31. The adapter of claim 30, wherein the insertion detecting means is arranged at a position where the shutter opening/closing knob rests when the adapter is set in the disk cartridge drive.

32. The adapter of claim 30, wherein the insertion detecting means is arranged at each of two positions where the shutter opening/closing knob passes.

33. The adapter of claim 17, wherein the insertion detecting means is arranged at an insertion front end of the adapter and is pressed with a stopper of the disk cartridge drive that stops the adapter at a proper position in the disk cartridge drive; and power supply from the power source is enabled when the insertion detecting means is pressed with the stopper and is disabled when the insertion detecting means is not pressed with the same.

34. The adapter of claim 17, wherein:

the insertion detecting means is arranged at an insertion rear end of the adapter and is pressed with a retainer of the disk cartridge drive that prevents an unwanted ejection of the adapter from the disk cartridge drive; and power supply from the power source is enabled when the insertion detecting means is pressed with the retainer and is disabled when the insertion detecting means is not pressed with the same.

35. The adapter of claim 17, further comprising a positioning hole to engage with a positioning boss of the disk cartridge drive, wherein:

the insertion detecting means is arranged in the positioning hole and is pressed with the positioning boss when the adapter is completely inserted into the disk cartridge drive; and power supply from the power source is enabled when the insertion detecting means is pressed with the positioning boss and is disabled when the insertion detecting means is not pressed with the same.

* * * * *